(12) United States Patent
Huang et al.

(10) Patent No.: US 9,332,471 B2
(45) Date of Patent: May 3, 2016

(54) CELL SELECTION OR HANDOVER IN WIRELESS NETWORKS

(71) Applicant: Transpacific IP Management Group Ltd., Taiwan (CN)

(72) Inventors: Chao-Hua Huang, Taiwan (CN); Po-Hsuan Tseng, Taiwan (CN); Kai-Ten Feng, Taiwan (CN)

(73) Assignee: TRANSPACIFIC IP MANAGEMENT GROUP LTD., Taipei (TW)

( * ) Notice: Subject to any disclaimer, the term of this patent is extended or adjusted under 35 U.S.C. 154(b) by 0 days.

(21) Appl. No.: 14/450,119

(22) Filed: Aug. 1, 2014

(65) Prior Publication Data

US 2015/0126192 A1    May 7, 2015

Related U.S. Application Data

(60) Provisional application No. 61/901,342, filed on Nov. 7, 2013, provisional application No. 61/925,568, filed on Jan. 9, 2014.

(51) Int. Cl.
*H04W 36/24* (2009.01)
*H04W 36/22* (2009.01)
*H04W 36/00* (2009.01)

(52) U.S. Cl.
CPC .......... *H04W 36/22* (2013.01); *H04W 36/0083* (2013.01)

(58) Field of Classification Search
CPC ..... H04W 28/00; H04W 28/02; H04W 36/22; H04L 41/0896; H04L 41/0654; H04L 41/12

USPC .............. 455/453, 450, 517, 432.1; 370/230, 370/235, 337
See application file for complete search history.

(56) References Cited

U.S. PATENT DOCUMENTS

| | | | |
|---|---|---|---|
| 2006/0166677 A1* | 7/2006 | Derakshan et al. | 455/453 |
| 2013/0040683 A1* | 2/2013 | Siomina et al. | 455/517 |
| 2015/0126201 A1 | 5/2015 | Beppler et al. | |

OTHER PUBLICATIONS

Kim, et al., "Adaptive MIMO Mode and Fast Cell Selection with Interference Avoidance in Multi-cell Environments," IEEE Fifth International Conference on Wireless and Mobile Communications, Aug. 2009, pp. 163-167.

Becvar, et al., "Fast Cell Selection with Efficient Active Set Management in OFDMA Networks with Femtocells," EURASIP Journal on Wireless Communications and Networking, pp. 1-15, 2012. Last accessed Oct. 30, 2014, 15 pages.

(Continued)

*Primary Examiner* — Phuoc H Doan
(74) *Attorney, Agent, or Firm* — Amin, Turocy & Watson, LLP

(57) ABSTRACT

Network device selection or handover schemes enable higher network capacity based on partially-observable Markov decision processes. Unavailable cell loading information is observed and/or predicted from non-serving base stations and actions are taken to maintain an active base station set or network device candidate data for selection in routing communications of a mobile device in a mobile device cell selection or handover procedure. A reward function is considered in the selection based on various parameters comprising system capacity, handover times, and mobility of a mobile device or mobile station.

30 Claims, 18 Drawing Sheets

(56) References Cited

OTHER PUBLICATIONS

IEEE. "IEEE Std 802.16m-2011: Standard for Local and metropolitan area networks—Part 16: Air Interface for Broadband Wireless Access Systems—Amendment 3: Advanced Air Interface", IEEE Computer Society and the IEEE Microwave Theory and Techniques Society, May 6, 2011. 1107 pages.

Son, et al., "Dynamic Association for Load Balancing and Interference Avoidance in Multi-cell Networks," IEEE Transactions on Wireless Communications, vol. 8, No. 7, Jul. 2009, pp. 3566-3576.

Sung, et al., "Predictive Association Control for Frequent Handover Avoidance in Femtocell Networks," IEEE Communications Letters, vol. 17, No. 5, May 2013, pp. 924-927.

Tseng, et al., "A Predictive Movement Based Handover Algorithm for Broadband Wireless Networks," in IEEE Wireless Communications and Networking Conference, Apr. 2008, pp. 2834-2839.

Halgamuge, et al., "Handoff Optimization Using Hidden Markov Model," IEEE Signal Processing Letters, vol. 18, No. 7, Jul. 2011, pp. 411-414.

IEEE. IEEE802.16m-08/004r5, IEEE 802.16m Evaluation Methodology Document (EMD), The IEEE 802.16 Working Group on Broadband Wireless Access Standards Std., Jan. 15, 2009. 199 pages.

3GPP TS 36.304 v10.6.0, LTE; Evolved Universal Terrestrial Radio Access (E-UTRA); User Equipment (UE) procedures in idle mode (3GPP TS 36.304 version 10.6.0 Release 10), Jul. 2012. 35 pages.

Office Action dated Jul. 13, 2015 for U.S. Appl. No. 14/450,135, 15 pages.

\* cited by examiner

CELL SELECTION OR HANDOVER IN WIRELESS NETWORKS

PRIORITY CLAIM

This application claims priority to U.S. Provisional Patent Application No. 61/901,342, filed on Nov. 7, 2013 and entitled "POMDP-BASED CELL SELECTION SCHEMES FOR WIRELESS NETWORKS," and also to U.S. Provisional Patent Application No. 61/925,568, filed on Jan. 9, 2014 and entitled "POMDP-BASED CELL SELECTION SCHEMES FOR WIRELESS NETWORKS." This application is also related to U.S. patent application Ser. No. 14/450, 135, filed Aug. 1, 2014, and entitled "CELL SELECTION OR HANDOVER IN WIRELESS NETWORKS." The respective entireties of the aforementioned applications are incorporated herein by reference.

TECHNICAL FIELD

This disclosure relates generally to wireless network systems, for instance, to cell selection or handover in wireless networks, e.g., based on a partially observable Markov decision process (POMDP).

BACKGROUND

The use of mobile devices and resulting mobile traffic continues to grow at a fast pace and the trend shows no signs of stopping. To meet the mobile traffic growth and improve the end user experience, mechanisms are desired to improve network efficiency, system capacity, and end user experience by cost effectively leveraging radio network technologies. The routing or transfer of network traffic to a Wi-Fi radio and to a cellular radio, for example, can affect the user experience. For example, if the network traffic is routed to a network or network device that is not appropriate for that network traffic, it can result in loss of the communication (e.g., a dropped call), poor service, and negatively impacts the user experience.

SUMMARY

Various embodiments described herein control a cell selection or handover/transfer process, e.g., based on a partially observable Markov decision process. According to an embodiment, for example, a system comprises a memory storing executable components and a processor, coupled to the memory, that executes or facilitates execution of the executable components. The executable components can comprise a candidate component configured to determine active device data corresponding to candidate network devices to use for transfer of communications of a mobile device based on a selection of a candidate network device from among the candidate network devices. The executable components can comprise an evaluation component configured to generate an evaluation of the candidate network devices of the active device data via a reward function to select the candidate network device from among the candidate network devices. The executable components can further comprise a network parameter component configured to determine a set of parameters of the reward function that comprise a capacity of the candidate network devices to be utilized in the evaluation.

For further examples, the executable components can further comprise a transition probability component configured to generate a cell loading state transition probability of the active device data based on a previous network load and a previous network event generated by the candidate network devices. The executable components can further comprise a partially observable markov decision component configured to account for a set of defined uncertainties in the capacity of the candidate network devices.

According to another example embodiment, a method can comprise determining, by a device comprising a processing device, an active network device data set comprising candidate network devices from which a candidate network device is selected for routing of communications of a mobile device, and determining a set of parameters of a reward function comprising a capacity of the candidate network devices. The method can further comprise generating an evaluation of the candidate network devices of the active network device data set via the reward function or selecting which of the candidate network devices of the active network device data set to which to communicate network traffic of the mobile device based on the evaluation.

For further examples, the method can comprise determining the capacity as a function of a total network bandwidth and respective signal-to-noise ratios for respective network device-to-mobile device links. The method can comprise generating a profile of the capacity via the reward function based on a previous load state and a set of previous actions corresponding to the candidate network devices, wherein the set of previous actions comprises at least one of an exceeding of a capacity limit or an executing of an off-loading event by the candidate network devices to transfer a connection of at least one mobile device connection to a different network device. The method can comprise generating the reward function based on a loading state transition probability for the candidate network devices that comprises a predicted capacity of the candidate network devices based on a previous load state and a set of previous actions.

Additionally, the method can comprise determining the set of parameters comprising determining a movement parameter of the mobile device, determining the set of parameters of the reward function comprising the capacity and a time cost of communicating the network traffic of the mobile device from a serving network device to the candidate network device of the candidate network devices, determining the set of parameters of the reward function comprising the capacity and a mobility of the mobile device, or determining the set of parameters of the reward function comprising the capacity, a time cost of communicating the network traffic of the mobile device from a serving network device to the candidate network device of the candidate network devices, and a mobility of the mobile device.

According to another example embodiment, a mobile device can comprise a memory storing executable instructions and a processor, coupled to the memory, that executes or facilitates execution of the executable instructions to at least determine active device data that is associated with candidate network devices with which to potentially communicate based on a selection of a candidate network device of the candidate network devices, generate an evaluation of the candidate network devices of the active device data comprising a network load level and a reward function for decreasing a number of handovers to a different network of the candidate network devices, and determine a network device of the candidate network devices of the active device data with which to communicate based on a reward determined by the reward function.

The processor of the mobile device can further execute or facilitate the execution of the executable instructions to route communications to the network device based on a capacity according to a partially observable markov cell selection. The processor can further execute or facilitate the execution of the executable instructions to route communications to the network device based on a handover time according to a partially observable markov cell selection. The processor can further execute or facilitate the execution of the executable instructions to route communications to the network device based on a current reward at a time slot determined by the reward function, a predicted reward by the reward function and a movement measure, according to a partially observable markov cell selection. The processor can further execute or facilitate the execution of the executable instructions to route communications to the network device based on a movement measure and a handover time, according to a partially observable markov cell selection.

The following description and the annexed drawings set forth in detail certain illustrative aspects of the disclosed subject matter. These aspects are indicative, however, of but a few of the various ways in which the principles of the various embodiments may be employed. The disclosed subject matter is intended to include all such aspects and their equivalents.

BRIEF DESCRIPTION OF THE DRAWINGS

Various non-limiting embodiments are further described with reference to the accompanying drawings in which.

DETAILED DESCRIPTION

Figure 1:
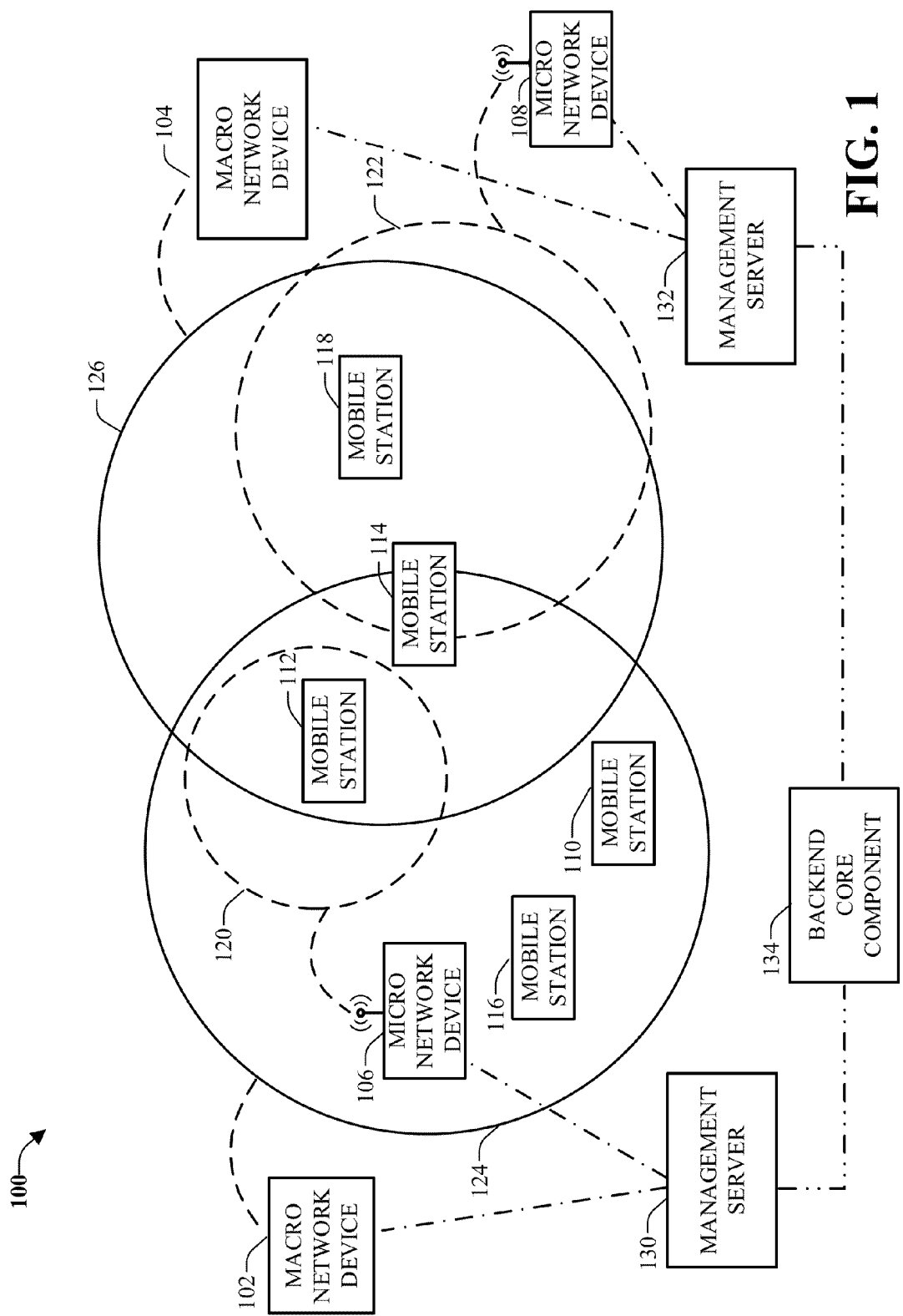
FIG. 1 illustrates an example, non-limiting wireless communications environment that can be utilized with the disclosed aspects.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word— without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, by scenario identification component to infer a starvation scenario present in a WiFi network in real-time. Furthermore, the artificial intelligence system can be used, by heuristic component to automatically determine heuristic probabilities associated with possible modifications to operating parameters that could alleviate an identified starvation scenario.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

Aspects of the subject disclosure will now be described more fully hereinafter with reference to the accompanying drawings that illustrate different example embodiments. In the following description, for purposes of explanation, numerous specific details are set forth in order to provide a thorough understanding of the various embodiments. However, the subject disclosure can embody many different forms and should not be construed as limited to the example embodiments set forth herein.

Overview

To guarantee quality of service (QoS), a feasible cell selection scheme can enable mobile stations (MSs) to associate with a base station (BS) that possesses the desired (e.g., best) channel and network conditions. In high-speed downlink packet access (HSDPA), fast cell selection (FCS) allows MSs to maintain an active set which comprises the candidate BSs, and the MS selects the serving BS (SBS) with the defined level (e.g., strongest) pilot signal in the active set. The idea of FCS can be further applied in OFDMA networks for the LTE-A standard to facilitate the SBS selection in heterogeneous networks. In this regard, the MS can execute cell selection or a cell reselection procedure to find a suitable cell after power-on or link loss according to the LTE-A system.

In 802.16m, either the MS or the SBS can initiate the handover procedure and select the next SBS. The procedure of transferring MS from the connection with its original SBS to the next BS is called handover. Handover helps the MS fulfill its QoS requirements from selecting a better SBS, but the procedure of handover also causes extra time delay and communication overheads. To ensure customer satisfaction, network providers aim to deliver a high quality service at any location, and to facilitate reliable and efficient mobile communications. Consumers can access a growing number of networks using a mobile device and still receive QoS by reducing handover time delay and communication overheads in the network.

To acquire higher network capacity, determining a proper network device that operates a communication network for a mobile device handover can be a cell selection problem, which is formulated based on a partially observable Markov decision process (POMDP). Systems and methods described can operate to observe and predict unavailable cell loading information from non-serving base stations and take action for maintaining an active base station set or data for a handover target selection. Various utility functions are designed to consider different factors in the proposed POMDP-based cell selection (POCS) schemes, including system capacity, handover time, and a mobility of a mobile station or device. With the considerations of cell loading as a hidden Markov model and a mobility parameter as a reward function, simulation results demonstrate that the proposed POCS schemes can outperform conventional received signal strength based methods for handover processes.

In an embodiment, a system, for example, can comprise a memory storing executable components and a processor that executes or facilitates execution of the executable components. The executable components can comprise, for example, a device candidate component configured to determine active device data (e.g., an active data set) that corresponds to candidate network devices, such as network devices unavailable or not communicatively coupled to a mobile device, but potentially available for a handover process. The candidate network devices can operate to route communications for the mobile device based on a selection of at least one candidate network device for routing communications to a network of the selected candidate network device. An evaluation component can be configured to generate an evaluation of the candidate network device(s) of the active device data, and maintain a list or entries of the candidates in the active device data. The evaluation can include various parameters, such as a network load level, and a reward function for decreasing a number of routing attempts for routing communications to a different network of the candidate network devices in the handover. A network parameter component can operate to determine the parameters, which then parameterize the reward function. The parameters can include, for example, a capacity of the at least one candidate network device that is determined as a function of a total network bandwidth and respective signal-to-noise ratios for respective network device-to-mobile device links at a timeslot. The parameters can also comprise a loading capacity of the at least one candidate network device, a time cost of routing the communications to the at least one candidate network device, a mobility of the mobile device, a current reward, a future reward of routing the communications to the at least one candidate network device, or any combination thereof. The current reward can be a function of a loading capacity of the at least one candidate network device or a time cost of routing the communications, for example, while the future reward can be a function of a mobility of the mobile device or a prediction of a movement vector of the mobile device.

Initiating a cell network selection or a handover procedure can comprise load balancing and mobility factors. For example, the number of connections of each base station (BS) is usually unequal as a result of a non-uniform population distribution. When a total amount of traffic in a current cell exceeds the capacity limit (a hot spot problem), an objective of load balancing among the network devices hosting corresponding networks for mobile stations (mobile devices) is to enhance user throughput by off-loading the data transmission to a neighboring cell with a load-balancing cell selection procedure, for example. In addition, due to mobile device movement, the received channel quality can decrease when the mobile station (MS) moves out of a current cell coverage area. An objective of utilizing mobility factors is to minimize the handover frequency while maintaining system capacity via a network device or cell coverage selection from among a set of network devices providing network communication in corresponding coverage areas.

A predictive movement based handover algorithm for decreasing the number of handovers with mobile devices moving among network devices can be utilized in handover selection processes. For example, a partially observable Markov decision process (POMDP) based handoff can observe the signal strengths from each BS or network device according to either measurement or prediction, which is utilized to estimate a set (one or more) of hidden states as the serving BS (SBS) sequence. In an embodiment, a POMDP framework can be modeled from a different perspective to select the next SBS based on traffic load information as a hidden Markov model (HMM), given that the traffic information of neighboring cell(s) is not fully known by the MS. Four versions of the POMDP based cell selection (POCS) schemes are proposed and are associated with different utility functions based on various considerations, including system capacity, handover time, mobility of MS, and mobility of the MS with a handover cost. In addition, a predictive movement of the MS is designed into the reward calculation. Both cell loading for the HMM and the mobility factors operate as parameters of a reward function used in a cell selection decision. Furthermore, simulation results are illustrated to validate that the cell loading and mobility information benefits with the proposed POCS schemes.

FIG. 1 illustrates an example, non-limiting wireless communication environment 100 in accordance with various embodiments described. The wireless communications environment 100 can include various wireless communications network devices that can generate a respective coverage area for hosting communications for one or more mobile stations (e.g., mobile devices, user equipment, and the like). The coverage area of some of the wireless communications networks can overlap such that one or more network devices can provide coverage areas or zones to the mobile devices whose coverage areas from different networks of network devices overlap. The network devices can operate with one another, in which at least some of the network devices can be configured to provide self-configuration and self-optimizing capabilities that provide the ability to automate certain operations, management functions and system management functions.

The wireless communications environment 100 can include one or more macro (cell) network devices 102, 104 that broadcast macro network zone coverage areas and one or more micro network devices 106, 108 (e.g., Pico network access point, Metro network access point, or other similar micro network access points) deployed within the a heterogeneous wireless communications environment 100 and servicing one or more mobile devices 110, 112, 114, 116, 118 in corresponding network coverage zones. Each wireless communications network (e.g., macro access points 102, 104 and micro access points 106, 108) comprises one or more network devices (e.g., a set of network devices), such as a base station that operates in conjunction with one another in order to process network traffic (e.g., handoff operations and coverage) for the one or more mobile devices 110, 112, 114, 116, or 118. The network devices (e.g., 102, 104, 106, 108) can be neighbors within one another that overlap or have coverage boundaries alongside or proximate to one another. For example, a number micro network devices 106, 108 can overlap or have neighboring coverage with each macro network device 102, 104 respectively. The macro network devices 102, 104 can comprise a set of network devices that are cellular enabled network devices, which could provide different network speeds (e.g., 2G, 3G, 4G, etc.). In another example, the micro access point devices 106, 108 can include a set of network devices that extend network coverage or expand the network environment at the cell edge, especially where access would otherwise be limited or unavailable, and can include any particular standard or communication protocol, such as for WCDMA, GSM, CDMA2000, TD-SCDMA, WiMAX, for LTE or other solutions.

The communications environment 100 can include one or more management servers 130, 132 that are communicatively coupled to the network devices such as the macro network devices 102, 104 and the micro network devices 106, 108 as a control-node for one or more networks. The management servers 130, 132 can operatively control mobile device tracking and paging procedures including retransmissions and handover (hand-off) operations to ensure seamless mobility through various network zones within the network environment 100. The management servers 130, 132 can control, for example, the bearer activation/deactivation process and choosing a serving gateway for the mobile devices 110, 112, 114, 116, or 118 at an initial attach and at the time of an intra-network handover (e.g., among the different networks device coverage zones). The management servers 130, 132 can authenticate the mobile devices by interacting with the other devices communicatively coupled thereto and/or sets of data servers such as a home subscriber server and the like. The management servers 130, 132 can operate in conjunction with one or more backend packet core components 134 having a processor and memory that can operate to generate and allocate temporary identities to the mobile devices and can terminate signaling protocol layers.

The communication environment 100 can operate to implement techniques for a heterogeneous network environment that provide automatic configuration of neighbor cell relations, for example. The managing servers 130, 132 can operate as network devices that can facilitate automatic neighbor relationship operations to configure discovered neighbor relations such that handovers can be performed in combination with neighbor relation establishment without dropping a mobile device connection to the networks of the network environment 100.

As illustrated, each of the one or more micro access points 106, 108 can have a corresponding service area 120, 122. In addition, each of the one or more macro network devices 102, 104 can have a corresponding service or broadcast area 124, 126. However, the wireless communications environment 100 is not limited to this implementation and various other architectures can also be employed. For example, the network devices of the communication environment 100 could deploy any number of Wi-Fi access points and respective service areas within the wireless communications environment 100.

A mobile device can contain some or all of the functionality of a system, subscriber unit, subscriber station, mobile station, mobile, wireless terminal, device, user equipment device, remote station, remote terminal, access terminal, user terminal, terminal, wireless communication device, wireless communication apparatus, user agent, user device, and the like, for example. A mobile station or mobile device can be a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card and/or another processing device for communicating over a wireless system. Each mobile device 110, 112, 114, 116, 118 can be served by the macro cell devices 102, or 104, or the micro cell devices 106, or 108, in which handovers can be controlled by a network data, data store, a data set, a data list, neighbor relation table (NRT), or the like that is managed or maintained by the managing servers 130, 132, a macro network device, a micro network device or the other network device, for example, or each mobile device itself. The mobile devices 110, 112, 114, 116, 118 can respectively broadcast an identifying signature or waveform, which can be an identification or fingerprint, that the network devices store from the UE devices as a time and frequency reference, as well as for identification. Each waveform can be enumerated by the Physical Cell Identity (PCI). The network devices of the network environment 100 can communicate broadcasts with UE devices comprising a globally unique cell identifier (CGI) as well and the network devices of the communication environment 100 can utilize mobile device neighbor relation functions, in which mobile devices can decode and report CGI information of neighbor cells to the serving cell upon request.

For example, a network device such as a macro cell network device 102 or 104 can maintain network data for each cell. The entries or candidates of the network data can comprise data that the network device utilizes about neighboring networks and network devices. Network device 102, for example, can have a complete knowledge of its neighbors, such as of network device 104, 106, and 108. Network devices 104, 106 and 108 can have a complete knowledge, an incomplete knowledge, or not be aware of all neighbors depending upon inaccuracies in signal propagation, maps data, if a network has been newly installed, or the like.

In an example scenario, networks can service mobile devices 110, 112, 114, 116, and 118 through one of the macro network devices 102, 104, or other micro network devices 106, 108 in a heterogeneous network. As a mobile device travels within the wireless communications environment 100, the respective mobile device can move in and out of the coverage area of the associated serving network device. For example, as a user is sending/receiving communications through their respective mobile device, the user might be walking, riding in a car, riding on a train, moving around a densely populated urban area (e.g., a large city), wherein the movement might cause the mobile device to be moved among various wireless communications networks. In such cases, it is beneficial to route the network traffic (e.g., handoff) from a serving network to a target network in order to continue the communication (e.g., avoid dropped calls).

The mobile devices 110, 112, 114, 116, and 118, for example, can operate to generate and maintain an active data set, such as a candidate device data set that dynamically includes a set of potential network devices for a handover procedure from one network device or SBS to another. The mobile devices operate to select the best SBS from the maintained active candidate device data based on different objective functions at a predefined timeslot. The number of associative BSs or network devices in an active set is no greater than a predetermined threshold M. $_h$ represents a ratio of handover time cost per timeslot, in which $0 < _h < 1$. If the new or selected network device or SBS is different from the original SBS, the ratio $_h$ of the timeslot can be utilized for the mobile device to exchange one or more control messages with the selected network device or BS without transmitting data. The cell loading of the network devices 102, 104, 106, 108, for example, can be represented in or defined by the number of mobile devices in communication with or having communications routed within the respective device coverage area because the traffic load can be proportional to the number of mobile devices communicatively coupled to a network device in the environment 100.

In addition, at most L mobile devices within the communication environment 100 can be enabled or allowed to connect to a particular network device or BS, and each mobile device 110, 112, 114, 116, and 118 can obtain the traffic load information from its active candidate data or data set. However, because the mobile device does not maintain an active data set with all the BSs N or network devices in the network environment, and only a partial subset of the set of all network devices, (i.e., M<N), the traffic load information for all the BSs will not be known exactly by each mobile device 110, 112, 114, 116, and 118. In an aspect therefore, the mobile devices 110, 112, 114, 116, and 118 or management servers 130, 132 can induce the adoption of POMDP framework in proposed POCS schemes.

A difference between POMDP and Markov decision process (MDP) is that the MDP requires full information of the environment 100 and network devices therein, while the POMDP can tolerate or incorporate uncertainties and still gain information from observations or sensed data from the network environment. The POMDP can be described or defined by a tuple $\langle S, A, T, R, \Omega \rangle$. In a cell selection or network device handover selection scheme implemented by the base station or a mobile device, cell loading for each BS or network device 102, 104, 106, or 108 can be quantized into units of the number of mobile stations for its load capacity and utilized to generate an L state Markovian model. Specifically, the state $s_k(t)$ can represent the number of connections, for example, of the k-th BS for a timeslot t. For ease of representation herein, the cell loading state vector can be written as $s(t) = [s_1(t) \ldots s_k(t) \ldots s_N(t)]$, where $s(t) \in S$ and $S = \{1, \ldots, L\}$.

Figure 2:
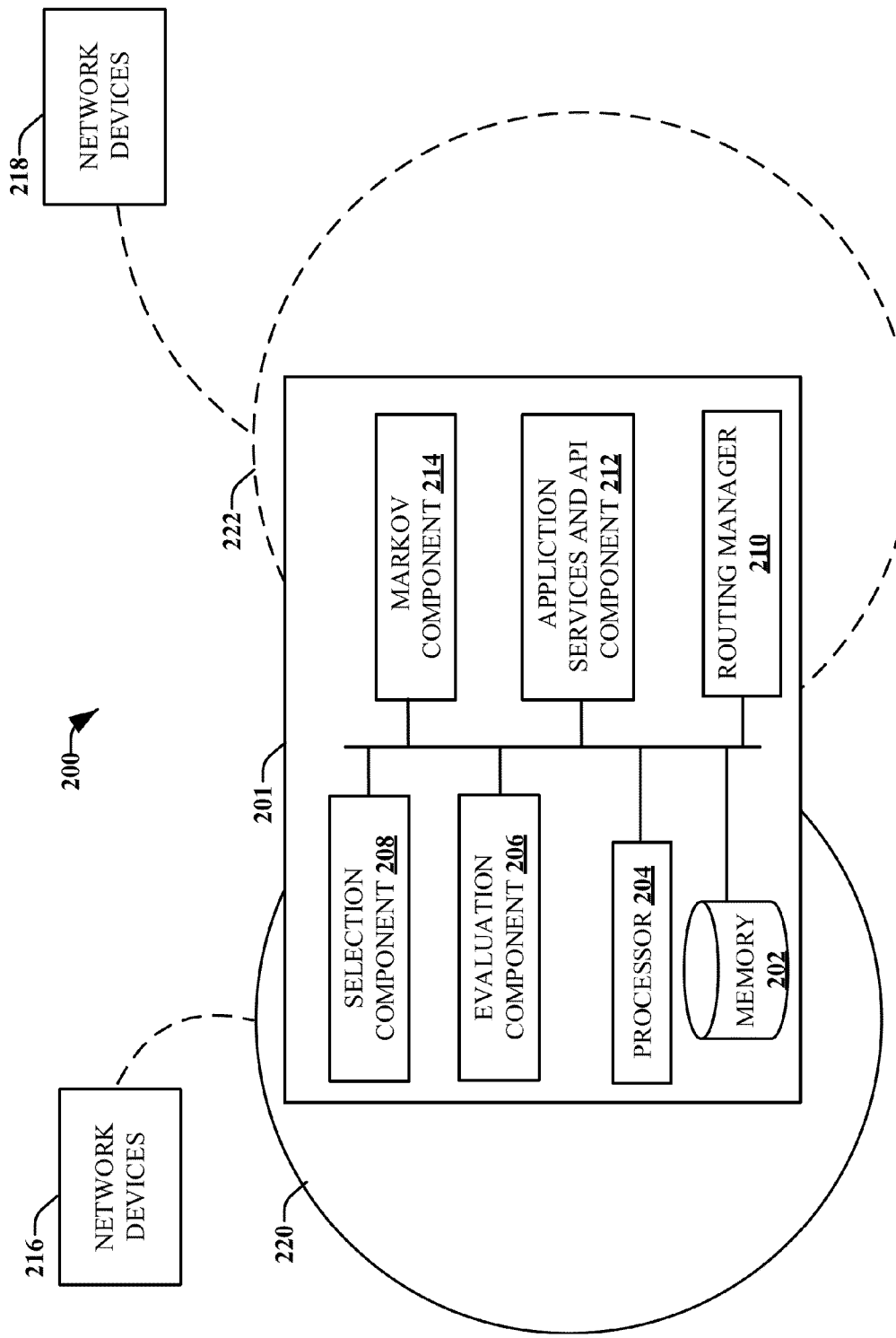
FIG. 2 illustrates an example, non-limiting network system for communications with network devices, according to an aspect.

Referring now to FIG. 2, illustrated is an example, non-limiting communication network system 200 for routing communications in handover operations for a mobile device and network devices that generate a network coverage area, according to aspects described. System 200 can be implemented, for example, on a mobile device 201 or be distributed throughout a set of self-organizing network devices of a heterogeneous network in communication with the mobile device 201. System 200 comprises at least one memory 202 that can store computer executable components and instructions. System 200 can also include at least one processor 204, communicatively coupled to the at least one memory 202. Coupling can include various communications including, but not limited to, direct communications, indirect communications, wired communications, or wireless communications. The processor 204 can facilitate execution of the computer executable components stored in the at least one memory 202. The at least one processor 204 can be directly involved in the execution of the computer executable component(s).

System 200 can comprise various components that can integrate with one or more mobile devices as an internal component, externally as a network device or as a virtual component. The system 200, for example, can comprise an evaluation component 206 that can be configured to compare one or more parameters associated with two or more wireless networks and further evaluate parameters that can comprise mobility data related to the mobility of the mobile device (e.g., accelerometer data, speed data, directional movement data), and network observed signaling data representing a signaling of the network devices, load data representing a load of the set of self-organizing network devices, and congestion data representing a congestion of the set of self-organizing network devices.

According to one embodiment, parameters associated with a first network, or a first set (one or more) of network devices, can be compared to parameters associated with a second network device or second set of network devices, and/or a parameters associated with subsequent (e.g., third, fourth) networks. The one or more parameters can include network load information, for example, or bandwidth utilization of the network (e.g., 3G, 4G, long term evolution, and so on). Other parameters can include peak usage times, available bandwidth of a network, a number of requests received by a network resource, as well as other metrics or parameters, such as events including a number of attach attempts by other mobile devices within a defined time slot or period of time, or a number of dropped connections of one or more mobile devices within the define time slot (period).

The evaluation component 206 can also be configured to compare the one or more network parameters, associated with the two or more wireless networks, with one or more parameters associated with the mobile device 201. The parameters can also include a movement or mobility parameter of the mobile device 201. The movement parameter can relate to whether the user equipment device is stationary or moving and, if moving, a speed at which the device is being moved and/or a direction to which the device is being moved. The speed and/or direction of the device can be analyzed with respect to a location of a cellular network and/or a Wi-Fi network, according to an implementation. For example, if the mobile device is being moved toward a network, that network might be favored over a network that the device is being moved away from, or not directly headed toward.

The evaluation component 206 is configured to maintain active network device data, for example, such as a data set, a table, or a set of active candidate device data that comprises one or more entries and corresponding information on parameters of network devices unavailable to the mobile device or not in communication with the mobile device. The evaluation component 206 can operate to generate an evaluation or a profile that comprises a first network load level and a first set of network parameters or parameter conditions of a first set of network devices. The parameters can comprise a load congestion, a capacity level, or a number of current mobile devices being managed for communication routing within a given network device that can operate as a potential handover candidate, for example. The evaluation or the profile can include a second network load level, a second set of network parameter conditions of a second set of network devices of a second network, and further include one or more parameter of the mobile device 201, for example.

The evaluation component 206 is further configured to evaluate network parameters or parameter conditions among network devices based on a reward function that determines a benefit of a handover to a particular network device within the active data set or candidate device data of the mobile device. The reward functions can include parameters comprising at least one of a capacity or load capacity, a frequency of connection transfers, a mobility parameter of the mobile device, a current reward (e.g., a capacity or load condition and/or a time delay involved with the transfer) or a predictive future reward.

For example, a capacity for a network device/base station can be determined as a function of a total network bandwidth and respective signal-to-noise ratios for respective network device-to-mobile device links at a timeslot. A connection transfer time can be determined via the evaluation manager 206 as a function of a penalty or delay of a transfer of a connection for the mobile device, which can be represented by a timeslot ratio of a timeslot, a total network bandwidth, and respective signal-to-noise ratios for respective network device-to-mobile device links at the timeslot, for example. The reward function can also be based on a mobility of the mobile device and a time/time length to transfer a mobile device connection, which can be determined as a function of a simulated time interval of a continuous movement parameter of the mobile device over a change of time into a set of simulated time intervals. In addition, the evaluation component 206 is further configured to evaluate network parameters/parameter using a reward function based on a non-fixed signal-to-noise ratio with respect to a mobility parameter of the mobile device. The non-fixed signal-to-noise ratio can be based on a current reward of a transfer of a connection to a network device and a predicted reward. For example, the current reward can be a function of a capacity at a timeslot for the transfer of the connection to a particular network device, or a time delay of the transfer. The predicted reward can be a function of a path loss at a distance for the transfer of the connection at the timeslot, for example.

The system 200 can further comprise a selection manager component 208 that can be configured to determine which radio technology (and associated set of network devices) should be chosen such that at least a portion of the network traffic of the user equipment (also referred to as user traffic) is routed to the selected network (e.g., by a routing component 210). The selection manager component 208 can operate, for example, to make determinations for policy considerations. The determination performed by selection manager component 208 can comply with a network selection policy received from a network device that currently provides a service to the mobile device (e.g., a set of source devices). In an implementation, complying with the network selection policy can include observing discovery information and selection policies of the serving network (e.g., set of serving devices). The discovery information can relate to one or more traffic routing rules established by the serving network.

The routing component 210 can be configured to route one or more portions of the network traffic of the user equipment device to a network devices chosen by the selection component 208. For example, a cellular network might be congested and, therefore, some of the traffic of the user equipment device can be kept on (or routed to) a LTE network, for example.

The system 200 further comprises an application services and application programming interface manager (API) 212. The application services and API manager 212 can operate to manage underlying flow state information, information to manage dynamic pricing or billing, and integrate proper interfaces to manage micro shift data delivery. The application services and API manager 212 can further provide virtual service portals for new Quality of Experience (QOE) dependent business models, enable analytic and knowledge dashboards to applications on the mobile device, and create personalized flow models and policy-based services for users, businesses and internal optimization tools.

A markov component 214 can be configured to determine, based on the evaluation of the evaluation component 208, a network device to route network traffic of the mobile device based on a hidden markov model. The markov component 214 can determine a markovian matrix that can comprise nonnegative real numbers, for example, representing a probability for a number of connections for the network devices/ base stations within the communication environment such as network devices 216 and 218, which each generate a communication network.

As stated above, the POMDP can be described or defined by the tuple $\langle S, A, T, R, \Omega \rangle$. In a cell selection or network device handover selection scheme implemented by the base station or a mobile device, cell loading for each BS or network device can be quantized into units of the number of mobile stations for its load capacity and utilized to generate an L state Markovian model. Specifically, the state $s_k(t)$ can represent the number of connections, for example, of the k-th BS for a timeslot t. For ease of representation herein, the cell loading state vector can be written as $s(t)=[s_1(t) \ldots s_k(t) \ldots s_N(t)]$, where $s(t) \in S$ and $S=\{1, \ldots, L\}$.

The mobile station/device 201, for example, can operate to maintain an active device data or candidate device data set A, where the element of A is the index of a network device or a base station in the active set and $A=\{1, \ldots, N\}$. The mobile station/device 201 can select the SBS (e.g., network device 216, 218 or other network device) at each timeslot among the BSs in the active set as $a_1(t)$, where $a_1(t) \in A$. The parameter $a_2(t)$ is a 1×M vector and it contains all the indexes of the base stations to be included in the active set A to provide active set maintenance. The action is denoted as a vector $a(t)=[a_1(t)a_2(t)]$. Based on the previous cell loading state and the taken actions (e.g., handover attempts, handover completions, dropped connections, loading data, etc.), $T_k$ represents the cell loading state transition probability, in which current cell loading state of the $_k$th BS only depends on the previous state and historical actions, i.e., $T_k[s_k(t)=i|s_k(t-1)=j]=P[s_k(t)=i|s_k(t-1)=j, a(1:t-1)]$, where $a(1:t-1)$ denotes actions from time 1 to t−1. The Markovian matrix is composed by a state transition probability of the number of connections for each BS/network device and can be known by the mobile station/device 201 via the markov component 214, for example. Due to the non-uniform population distribution as hot-spot problem, the Markovian matrix of each BS in the wireless network is considered different.

Because full information or complete and accurate information of cell loading for a network device is not entirely observable by a mobile device, a belief state which stands for or represents a statistical probability of the cell loading state, can be utilized to represent a state uncertainty. With N network devices or BSs in the network environment, the dimensions of belief state $L^N$ grows exponentially as the number of BSs increases, which is computationally complex. A network environment can, for example, comprise the set of network devices operable for routing communications of a mobile device or station that could operate as potential handover candidate(s) for the mobile device. Thus, a sub-optimal strategy is considered that each network device or BS keeps track of its cell load and estimates the transition probability separately and can be utilized by reducing a size of belief states to become N, i.e., the belief state vector of the kth network device or BS is represented as $b[s_k(t)]=\{b_1[s_k(t)] \ldots b_i[s_k(t)] \ldots b_L[s_k(t)]\}$, where $b_i[s_k(t)]$ stands for the probability of cell loading state $s_k(t)=i$. Under N independent cell loading states, the belief state comprises sufficient statistical information for the past history. With sufficient statistic for the design of action, each network device or BS evolves independently which consequently reduces the complexity to O(N). Since each of the BSs contains at most L users (e.g., mobile devices) as the maximum cell loading, the belief state value of cell loading state $s_k(t)=i$ is denoted as $b_i[s_k(t)]$ with its value in the interval [0,1] and $\Sigma_{i=1}^{L} b_i[s_k(t)]=\Sigma_{i=1}^{L} P[s_k(t)=i]=1$.

Moreover, the parameter O represents the finite set of observations. The mobile device or station can obtain $s_k(t)$ where $k \in A$ from the active set with total M network devices or BSs. However, even though cell loading of the BSs is not available, the proposed cell selection schemes can make decisions based on the prediction from HMM. The observation $o_k(t)$ represents the observed number of connections for the k-th BS at timeslot t, and $o_k(t) \in O$, where $O=\Sigma=\{1, \ldots, L\}$. The expression $\Omega[s_k(t)=i]=P[o_k(t)=I|s_k(1:t), a(1:t-1)]$ represents the likelihood of observation $o_k(t)$ from the resulting historical state $s_k(1:t)$ and action $a(1:t-1)$. Providing that $s_k(t)$ is available, the observation is described as a Dirac delta function as $\Omega[s_k(t)=i]=\delta[i-s_k(t)] \forall k \in A$ and $\forall i \in \Sigma$. On the other hand, if $s_k(t)$ is not available, the belief is predicted based on the transition model while the observation is described as $\Omega[s_k(t)=i]=1/L$, $\forall k \notin A$ and $\forall i \in \Sigma$. For example, M=N stands for the availability of all the cell loading information and the POMDP model becomes equivalent to an MDP model. Based on the transition and observation functions, the belief update process can be acquired by Baye's Theorem as, $$b_i[s_k(t)] = P\{s_k(t) = i \mid o_k(1:t), a(1:t-1)\} \quad (1)$$

$$= \frac{\Omega[s_k(t) = i] \sum_{j=1}^{L} T_k[s_k(t) = i \mid s_k(t-1) = j] b_j[s_k(t-1)]}{P[O_k(t) \mid O_k(1:t-1), a(1:t-1)]}$$

where $P[o_k(t)|o_k(1:t-1), a(1:t-1)]$ is a normalizing factor.

Furthermore, $r[s_k(t), a(t)]$ is the expected reward of taking the action $a(t)$ at state $s_k(t)$. Since there are uncertainties of the states, the expected reward over the states is derived as:

$$R\{b[s_k(t)], a(t)\} = \Sigma_{i=1}^{L} b_i[s_k(t)] \cdot r[s_k(t)=i, a(t)]. \quad (2)$$

Consequently, the optimal policy to maximum expected reward for the cell selection problem is to select the action as $$\hat{a}(t) = \underset{\forall k \in \{1 \ldots N\}, a(t)}{\arg \max} R\{b[s_k(t)], a(t)\}. \quad (3)$$

Figure 3:
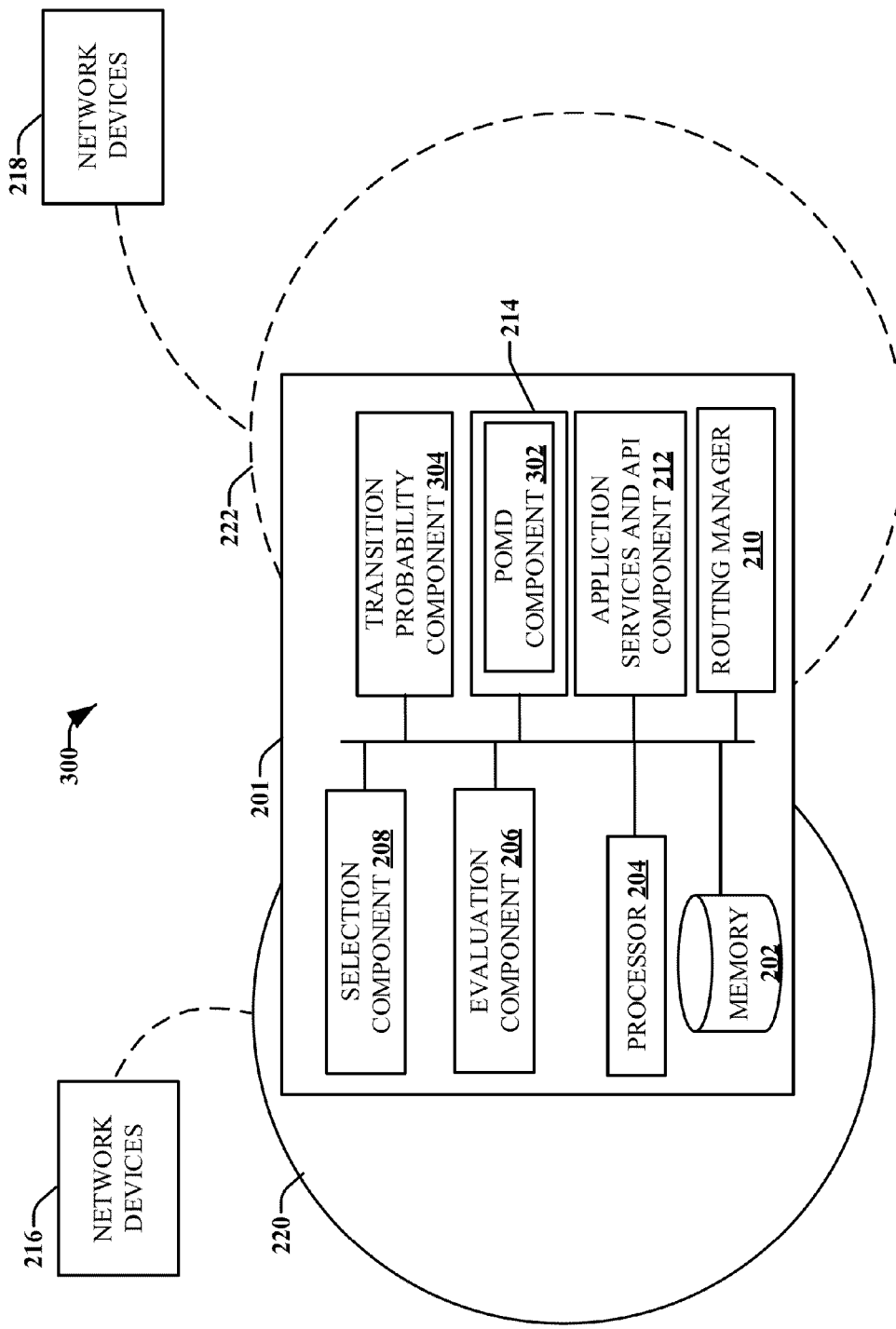
FIG. 3 illustrates an example, non-limiting network system for communications with network devices, according to an aspect.

FIG. 3 illustrates an example, non-limiting illustrated is an example, non-limiting communication network system 300 for routing communications in handover operations for a mobile device and network devices that generate a network coverage area, according to aspects described. Aspects and components are similar to the communication network environments or systems described above. The components of the environment can operate within a mobile device and/or one or more network devices 216 and 218, which can include any external network device for operating a corresponding network coverage area for routing communications such as a macro network device, a micro network device, a management server, a backend core component and the like.

The network system 300 can further comprise a partially observable markov decision (POMD) component 302 that is part of or communicatively coupled to the markov component 214 and a transition probability component 304. The POMD component 302 is configured to account for a set of defined uncertainties in a first network load level and a second network load level of different corresponding network devices for comparison in the evaluation.

As discussed above, $T_k$ represents a cell loading state transition probability that is based on a previous cell loading state of a network device and the taken (historical) actions (e.g., handover attempts, handover completions, dropped connections, loading data, etc.) by the network device, in which current cell loading state of the $k$th BS only depends on the previous state and historical actions, i.e., $T_k[s_k(t)=i|s_k(t-1)=j]=P[s_k(t)=i|s_k(t-1)=j, a(1:t-1)]$. Because full information or complete and accurate information of cell loading for a network device is not entirely observable by a mobile device, a belief state which stands for or represents a statistical probability of the cell loading state, can be generated by the POMD component to represent a state uncertainty. Thus, the markov component 214 is operable to factor uncertainties and utilize information from observations, rather than precise and entire information of the network devices in the communication environment as sensed by a mobile device.

According to the above operations, the partially observable markov decision component 302 can be configured to generate a profile of a first network load level and a second network load level based on a corresponding previous load state and a set of corresponding previous actions with respect to time. The previous actions can comprise statistics on events involving the network device exceeding a capacity limit, a capacity or loading data of mobile devices having communications being routed on the corresponding network device, an offloading event by the first set of network devices and the second set of network devices to transfer a connection of at least one mobile device to a different network device, handover attempts, handover completions, dropped connections, time delays for handover, etc., for example.

The transition probability component 304 is configured to generate a cell loading state transition probability as a current cell loading state of one or more active network devices of the active network device data maintained by the mobile device or another network device based on a previous network load level at a defined time slot and on a previous network event generated by the at least one active network device. The transition probability component 304 is configured to generate a cell loading state transition probability as a current cell loading state of one or more active network devices of the active network device data maintained by the mobile device or another network device based on a previous network load level at a defined time slot and on a previous network event generated by the at least one active network device. As discussed above, with N network devices or BSs in the network environment, the dimension of belief state $L^n$ grows exponentially as the number of BSs increases, which is computationally complex. Thus, a size of belief states is reduced to become N, i.e., the belief state vector of the kth network device or BS is represented as $b[s_k(t)]=\{b_1[s_k(t)] \ldots b_i[s_k(t)] \ldots b_L[s_k(t)]\}$, where $b_i[s_k(t)]$ stands for the probability of cell loading state $s_k(t)=i$. Under N independent cell loading states, the belief state comprises sufficient statistical information for the past history. With sufficient statistic for the design of action, each network device or BS evolves independently which consequently reduces the complexity to O(N). Since each of the BSs contains at most L users (e.g., mobile devices) as the maximum cell loading, the belief state value of cell loading state $s_k(t)=i$ is denoted as $b_i[s_k(t)]$ with its value in the interval [0,1] and $\sum_{i=1}^{L} b_i[s_k(t)] = \sum_{i=1}^{L} P[s_k(t)=i]=1$.

Figure 4:
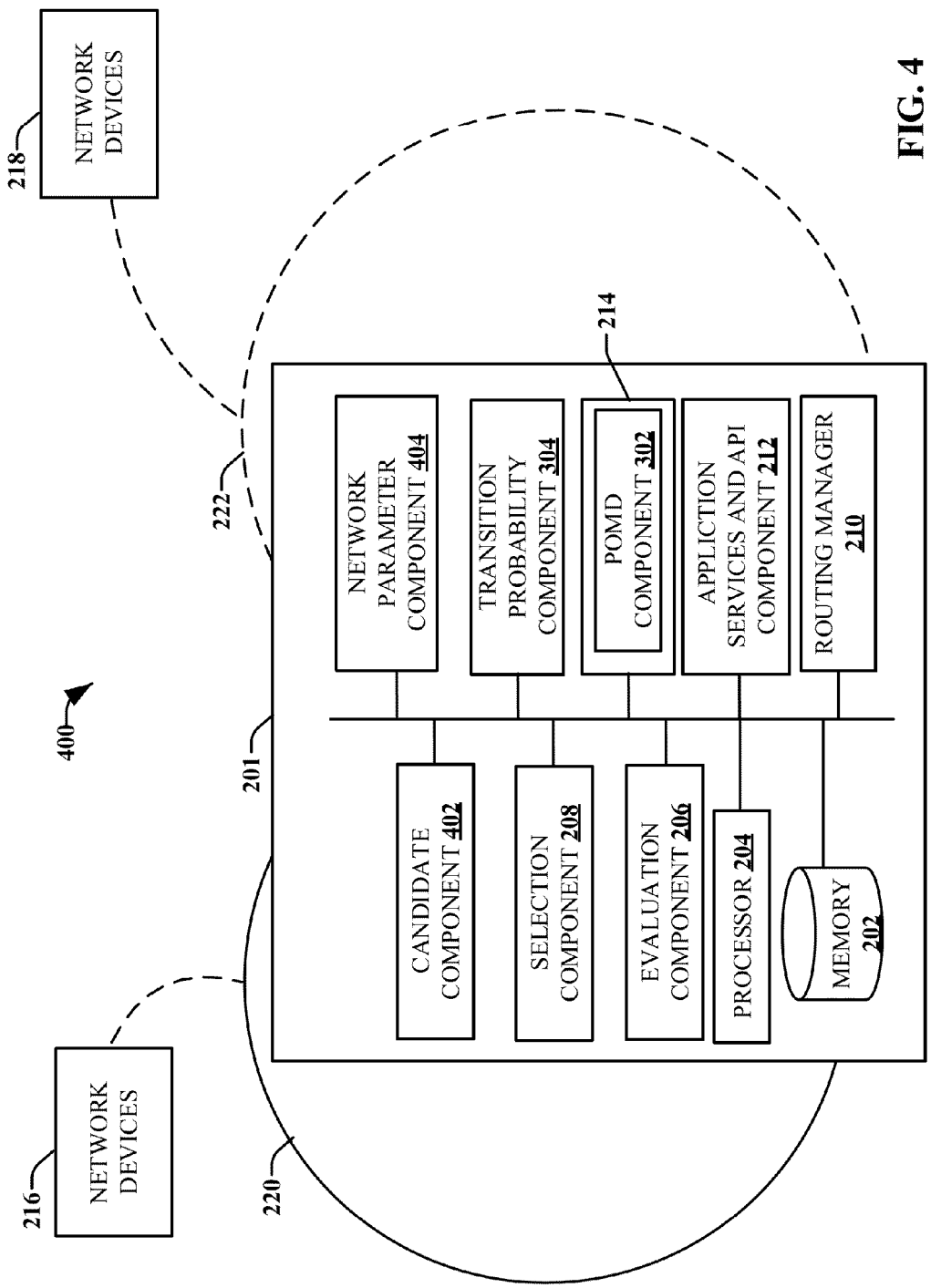
FIG. 4 illustrates an example, non-limiting system for communications with network devices for cell selection purposes, according to an aspect.

Referring to FIG. 4, illustrated is an aspect of a non-limiting communication network system 400 for routing communications in handover operations for a mobile device and network devices that generate a network coverage area, according to aspects described. Aspects and components are similar to the communication network environments or systems described above. The system 400 further comprises a candidate component 402 and a network parameter component 404.

The candidate component 402 can be configured to determine active device data comprising corresponding candidate network devices for potentially routing communications for a mobile device based on a selection of at least one candidate network device. The active device data or data set can be dynamically maintained as one or more network devices are sensed and populated within the data for tracking or observation. The data can include information that corresponds to each network device that is monitored via the evaluation component 206, discussed in detail supra.

The network parameter component 404 can operate to detect different parameters in relation to each network device within the active device data. For example, the network parameter component 404 can be configured to determine parameters of the reward function comprising a capacity of the at least one candidate network device. The capacity can be determined as a function of a total network bandwidth and respective signal-to-noise ratios for respective network device-to-mobile device links at a timeslot. The network parameter component 404 can be configured to determine a set of parameters of the reward function that comprise a loading capacity of the at least one candidate network device, such as an amount of data or connection number that can be established based on a current state or a time slot of the network device. The network parameter component can be configured to determine the set of parameters of the reward function comprising a time cost of routing the communications to the at least one candidate network device, or of a handover operation, in addition to a mobility (direction, acceleration, speed, etc.) of the mobile device relative to a neighboring cell network or cell network device coverage area, for example. The network parameter component can also be configured to determine a set of parameters of the reward function that comprise a current reward and a future reward of routing the communications to the at least one candidate network device. The current reward, for example, can be a function of a loading capacity of the at least one candidate network device or a time cost of routing the communications, and the future reward can be a function of a mobility of the mobile device or a prediction based on the mobility for a handover procedure. For example, whether a handover will be required, network devices available based on the mobility, need for a specific network or data amount, could be factors involved in the prediction.

In an aspect, four POMDP-based cell selection (POCS) schemes can be implemented with the above referenced components with different reward functions in equation (3) above based on capacity, handover frequency, and mobility of the mobile device or MS. In a capacity-based POCS (C-POCS) scheme, for example, a higher throughput can be generated if users transmit more data within a fixed time interval. Assuming that there is a larger amount of data greater than capacity to be transmitted, the reward function of proposed capacity-based POCS (C-POCS) scheme is defined to achieve high system capacity:

$$r[s_k(t) = i, a(t)] = I_k[a_1(t)]\frac{W}{i}\log_2(1 + \xi_k(t)), \quad (4)$$

$$\text{where } I_k[a_l(t)] = \begin{cases} 1, & a_1(t) = k \\ 0, & a_1(t) \neq k \end{cases},$$

W is the total network bandwidth, and $\xi_k(t)$ represents the SNR for the k-th BS-to-MS link at timeslot t. Notice that compared to conventional capacity objective function, the term $$\frac{W}{i}$$

includes the bandwidth allocation by considering the cell loading. It helps the MS avoid selecting the BS with higher load such as to decrease the occurrence of hot spot problem.

In another aspect, a handover-based POCS (H-POCS) scheme utilizes a handover delay or a time of transmission delay caused by a handover process, in which the transmission interrupt can influence the QoS of network communication for a mobile device. The handover-based POCS (H-POCS) scheme (processes) can effectively reduce the handover time experienced, in which the reward of the H-POCS scheme for non-serving BSs can be defined as $$r[s_k(t) = i, a(t)] = \{1 - \gamma_h[a_1(t)]\}\frac{W}{i}\log_2(1 + \xi_k(t)) \quad (5)$$

where $\gamma_h$ is the ratio of a timeslot representing the penalty from conducting a handover procedure as $$\gamma_h[a_1(t)] = \begin{cases} 0, & a_1(t) = a_1(t-1) \\ \gamma_h, & a_1(t) \neq a_1(t-1) \end{cases}$$

If $a_1(t)$ is the same as $a_1(t-1)$, SBS will not be changed and no handover is needed, i.e., handover cost is equal to 0 (zero). On the other hand, if the selected BS is changed, handover time cost will be incurred. The reward for the current SBS can be calculated according to equation (4) above. Since $r[s_k(t)=i, a(t)]$ in equation (5) considers the time cost of handover, the expected reward of the non-serving BSs in (5) would be smaller than the calculated result in equation (4). Therefore, it can avoid a ping-pong effect, i.e., too many unnecessary handover occurrences, when MS moves around the cell edges or cell network coverage area boundaries/borders.

In another aspect, a mobility-based POCS (M-POCS) scheme or processes can be utilized to consider a mobility parameter of the mobile device/station, in which the received SNR is not be fixed when the MS is moving fast or past a predetermined threshold of speed (e.g., when driving a car, traveling by train, or the like) in the network. Therefore, not only the current reward such as a capacity at a timeslot t, but also a future reward predicted by the mobility of the mobile device can be taken into consideration in the reward function.

In an embodiment, a system 201 comprises a memory 202 storing executable components and a processor 204, coupled to the memory 202, that executes or facilitates execution of the executable components. The executable components can comprise a candidate component 402 configured to determine active device data corresponding to candidate network devices (e.g., network device 216, 218 or other network device having corresponding service areas 220, 222) to use for transfer of communications of a mobile device based on a selection of a candidate network device from among the candidate network devices. The executable components can comprise an evaluation component 206 configured to generate an evaluation of the candidate network devices of the active device data via a reward function to select the candidate network device from among the candidate network devices. The executable components can further comprise a network parameter component 404 configured to determine a set of parameters of the reward function that comprise a capacity of the candidate network devices to be utilized in the evaluation.

The network parameter component 404 can further be configured to determine the set of parameters of the reward function comprising the capacity as a function of a total network bandwidth and respective signal-to-noise ratios for network device-to-mobile device links of the candidate network devices. The set of parameters of the reward function can comprise a time cost of respectively routing the communications to the candidate network devices, a mobility of the mobile device, a time cost of respectively routing the communications to the candidate network devices, and a mobility of the mobile device, or a signal to noise ratio or a signal strength of the candidate network devices.

The evaluation component 206 can be further configured to evaluate the set of parameters. In this regard, the evaluation component 206 can be further configured to evaluate the set of parameters using the reward function based on at least one of the capacity, a frequency of connection transfers, or a mobility parameter of the mobile device. Alternatively, the evaluation component 206 can be further configured to evaluate the set of parameters using the reward function based on a connection transfer time that is a penalty of at least one of a transfer of a connection of the mobile device, a total network bandwidth, or respective signal-to-noise ratios for network device-to-mobile device links. The evaluation component 206 can be further configured to evaluate the set of parameters using the reward function based on a non-fixed signal-to-noise ratio for a mobility of the mobile device. The non-fixed signal-to-noise ratio can be a function of a current reward of a transfer of a connection to the candidate network devices and a predicted reward. The current reward can be a function of the capacity at a timeslot for the transfer of the connection, and the predicted reward can be another function of a path loss at a distance for the transfer of the connection at the timeslot.

For another example, the evaluation component 206 can be configured to evaluate the set of parameters using the reward function based on a mobility of the mobile device and a time of a transfer of a connection that is determined as a function of a simulated time interval of a continuous movement parameter of the mobile device over a defined change in time into a set of simulated time intervals, a penalty of the transfer of the connection of the mobile device, a total network bandwidth, and respective signal-to-noise ratios for respective network device-to-mobile device links.

The executable components can further comprise a transition probability component 304 configured to generate a cell loading state transition probability of the active device data based on a previous network load and a previous network event generated by the candidate network devices.

The executable components can further comprise a partially observable markov decision component 302 configured to account for a set of defined uncertainties in the capacity of the candidate network devices. In this regard, the partially observable markov decision component 302 can be configured to generate a profile of the capacity based on a corresponding previous load state and a set of corresponding previous actions that comprise at least one of exceeding a capacity limit or an off-loading event by the candidate network devices to transfer a connection of the mobile device to the selected candidate network device.

Figure 5:
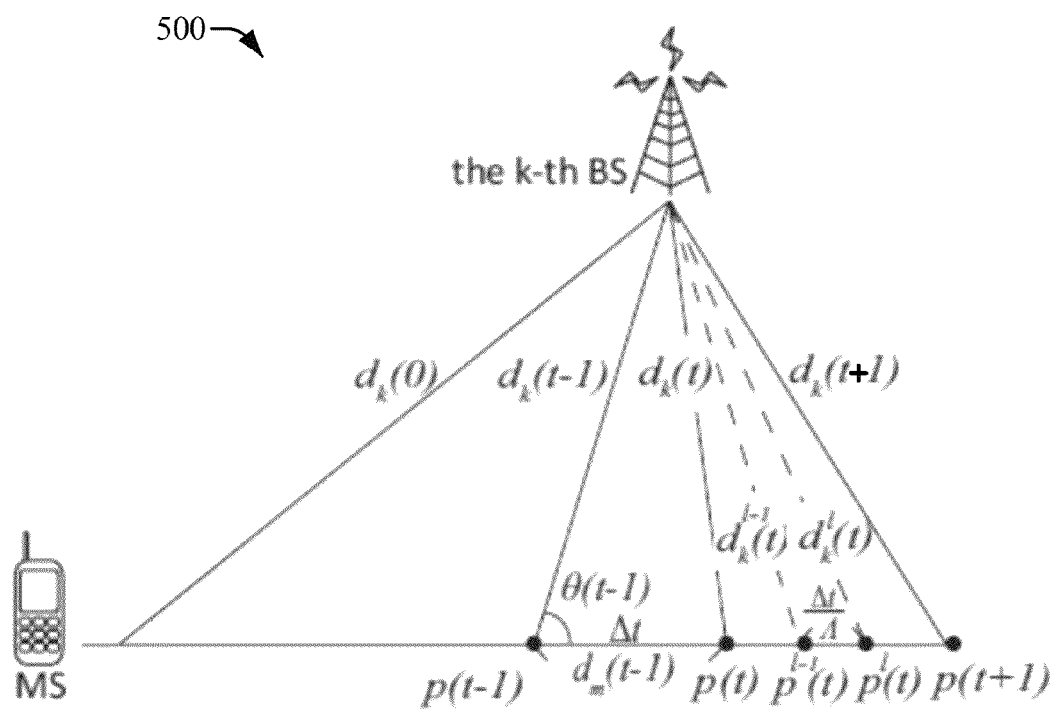
FIG. 5 illustrates an example schematic diagram for a distance estimation between a mobile station and a base station in a system for network communications, according to an aspect.

FIG. 5 illustrates aspects of the M-POCS processes discussed. Assuming that beyond a close-in distance d0, the path loss model of distance $d_k(t)$ for the k-th BS-to-MS link at timeslot t, can be written as:

$$PL[d_k(t)] = A + 10\alpha \log_{10}\left[\frac{d_k(t)}{d_0}\right] + n(t), \forall d_i \geq d_o, \quad (6)$$

where $$A = 20\log_{10}\frac{4\pi d_o}{\lambda}$$

is the decibel path loss at distance d0; $\lambda$ is the carrier wavelength and $\alpha$ is the path loss exponent that depends on the environment. The parameter n(t) represents a shadowing effect with a normal distribution. According to experimental results from a Gudmundson modeling process, the fading process of two consecutive observation samples can be expressed as $$E[n(t-1)n(t)] = \sigma_n^2 \cdot \exp\left(-\frac{|d_k(t-1) - d_k(t)|}{\kappa}\right) \quad (7)$$

where $d_k(t-1)$ and $d_k(t)$ are the distances of these two consecutive observation samples and $\kappa$ represents how fast the correlation is decayed with a distance. Based on equation (7), when $d_k(t-1) \approx d_k(t)$, the signal variance $\sigma_n^2$ demonstrates that the fading effect between n(t-1) and n(t) are strongly correlated as $d_k(t-1)$ and $d_k(t)$ of two observation samples that are close to each other. As a result, the path loss model for two consecutive points can be derived from equation (6) as $$PL[d_k(t)] - PL[d_k(t-1)] = 10\alpha \log_{10}\left[\frac{d_k(t)}{d_k(t-1)}\right], . \quad (8)$$

Figure 6:
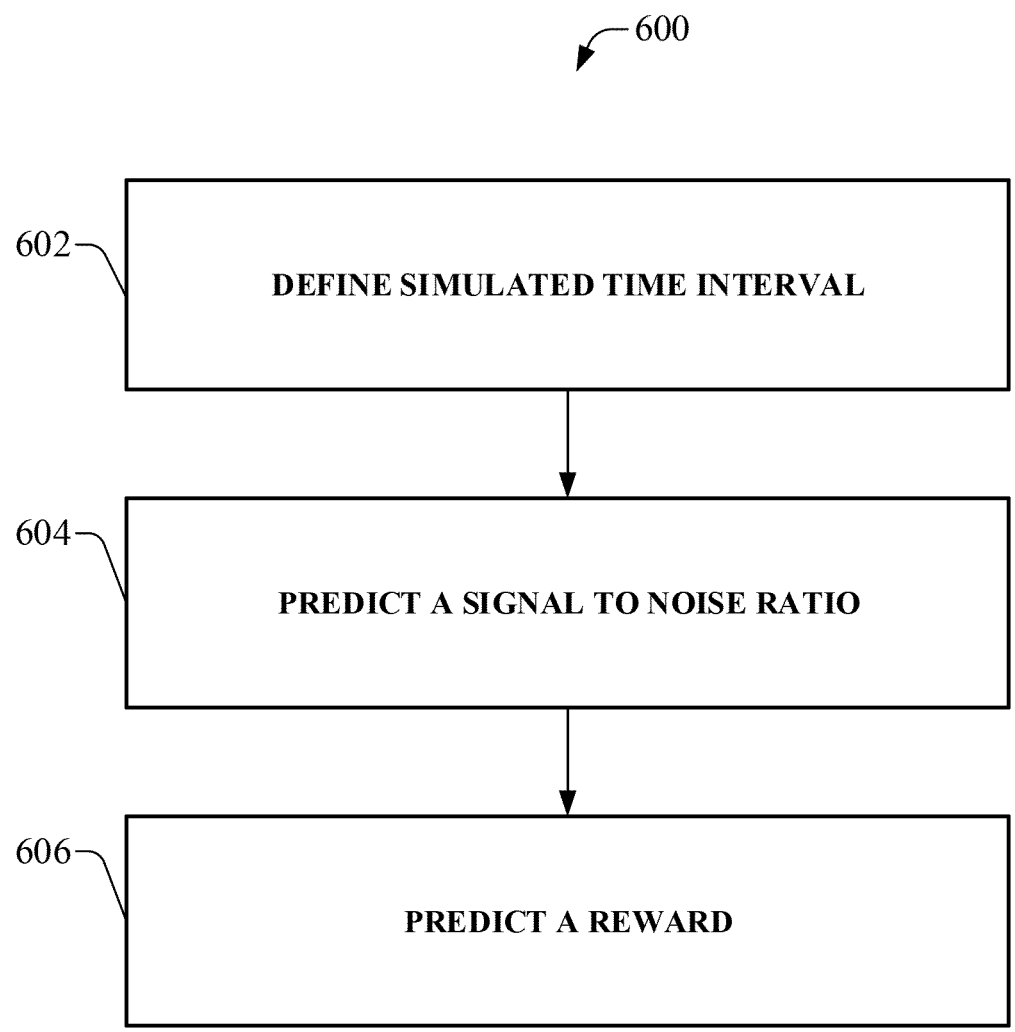
FIG. 6 illustrates an example, non-limiting method for routing network traffic, according to an aspect.

The objective of M-POCS scheme is to calculate the reward in equation (4) is based on the prediction of the mobile device's movement. In FIG. 5, p(t) denotes the position of the mobile device/station (MS) at timeslot t and $p^1(t)$ represents the position of the MS at the 1-th simulated time interval after p(t). $\Delta t$ is the predefined length of a timeslot. Assuming that the referenced distance $d_k(0)$ and the referenced path loss $PL[d_k(0)]$ are acquired as the empirical values while $PL[d_k(t-1)]$ and $PL[d_k(t)]$ are also obtainable at time instants t−1 and t. From equation (8), the distances $d_k(t-1)$ and $d_k(t)$ can be acquired with the known values of $d_k(0)$ and $PL[d_k(0)]$. Assuming that the velocity and moving direction from p(t) to p(t+1) are the same as those from p(t−1) to p(t), i.e., v(t)=v(t−1) and $\theta(t)=\theta(t-1)$, the moving distance of the mobile device is also the same as $d_m(t)=d_m(t-1)=v(t-1)\cdot \Delta t$. By the law of cosines, $\theta(t-1)$ in FIG. 5 is calculated based on $d_k(t-1)$, $d_k(t)$ and $d_m(t-1)$. Therefore, based on $\theta(t-1)$, $d_k(t-1)$, $d_m(t-1)$, the following method 600 illustrated in FIG. 6 can be utilized to predict the expected capacity from p(t) to p(t+1).

At 602, define a simulated time interval $$\frac{\Delta t}{\Lambda}:$$

To avoid dramatic changes of the SNR as the mobile device moves, the continuous movement of the mobile device can be modeled by splitting $\Delta t$ into $\Lambda$ simulated time intervals, where $\Lambda$ is selected to be a large number. As $$\frac{\Delta t}{\Lambda}$$

is small, the value of SNR changes slowly within the simulated time interval.

At 604, predict the SNR: The distance from the MS's position $p^1(t)$ to the k-th BS denoted as $d^1_k(t)$ is obtained by:

$$[d_k^1(t)]^2 = [d_k(t-1)]^2 + \left[d_m(t-1) + l \cdot \frac{d_m(t-1)}{\Lambda}\right]^2 -$$
$$2d_k(t-1) \cdot \left[d_m(t-1) + l \cdot \frac{d_m(t-1)}{\Lambda}\right]^2 \cdot \cos[\theta(t-1)].$$

Since the path loss from the k-th BS to $p^1(t)$ as $PL[d^1_k(t)]$ can be calculated in equation (8) by $d^1_k(t)$, $d_k(0)$, and $PL[d_k(0)]$, the mobile device can therefore calculate a predicted SNR for the k-th BS-to-MS link at the 1-th simulated timeslot after p(t), i.e., the value of $$\xi_k^l\left(t + \frac{\Delta t}{\Lambda} \cdot l\right).$$

At 606, predict the reward: After obtaining the predicted SNR from the k-th BS, the future reward considering MS's movement is calculated as $$r[s_k(t) = i, a(t)] = \frac{W}{i}\sum_{l=1}^{\Lambda}\frac{1}{\Lambda}\log_2\left[1 + \xi_k^l\left(t + \frac{\Delta t}{\Lambda} \cdot l\right)\right], \quad (9)$$

After calculating the predicted rewards of all the BSs, the mobile device can choose the BS which has the maximum reward to become its SBS for the next timeslot.

In a mobility and handoff-based POCS (MH-POCS) scheme a handoff can occur based on the mobile device mobility parameters and a time delay for handover with respect to a network device. The MH-POCS scheme considers both the mobility of MS and the handover time cost. The reward function of a nonserving BS is calculated by multiplying $1-\gamma_h[a_1(t)]$ with equation (9) as $$r[s_k(t) = i, a(t)] = \{1 - \gamma_h[a_1(t)]\}\frac{W}{i}\sum_{l=1}^{\Lambda}\frac{1}{\Lambda}\log_2\left[1 + \xi_k^l\left(t + \frac{\Delta t}{\Lambda} \cdot l\right)\right],$$

while the reward function $r[s_k(t)=i, a(t)]$ for a current SBS is calculated according to equation (9).

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases. Reference may be made to the figures described above for ease of description. However, the methods are not limited to any particular embodiment or example provided within this disclosure and can be applied to any of the systems disclosed herein.

Figure 7:
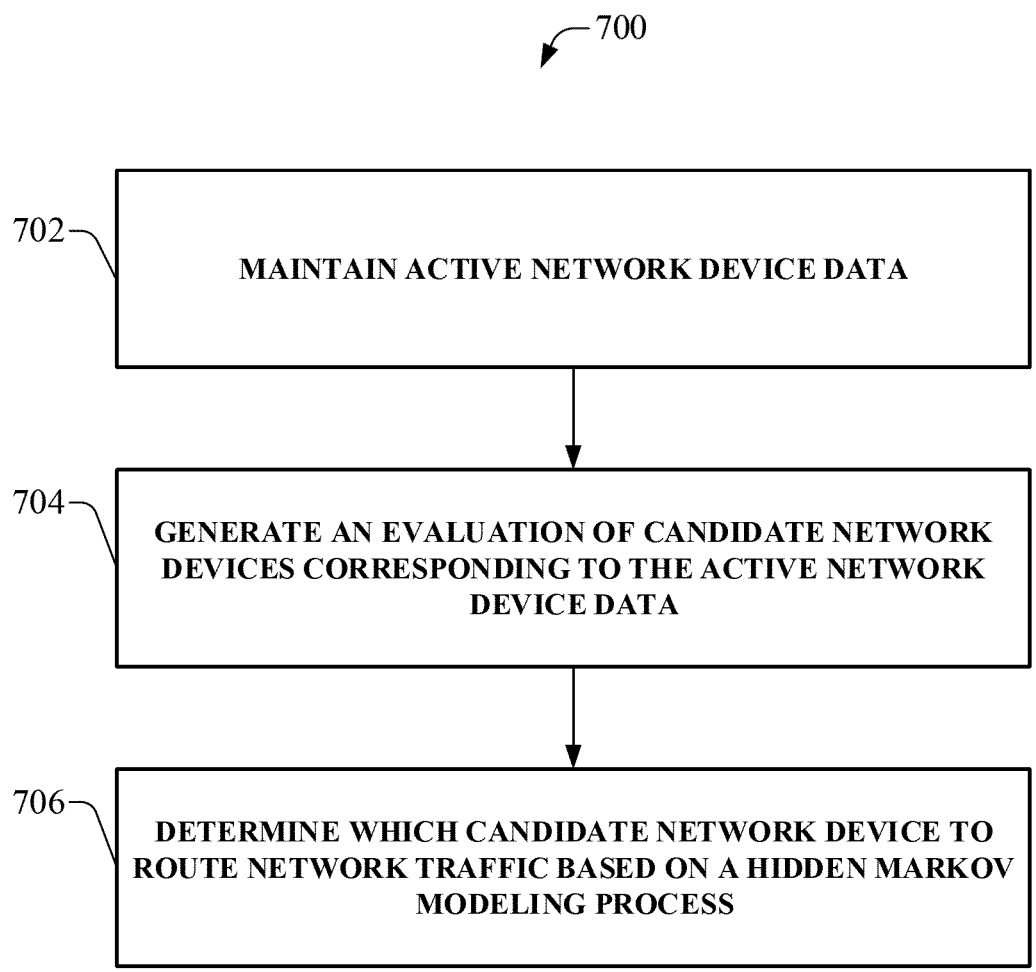
FIG. 7 illustrates another example, non-limiting method, according to an aspect.

FIG. 7 illustrates an example, non-limiting method 700 for a cell selection or handover processor for a mobile device in a wireless network environment. The method 700 initiates at 702 with maintaining, by a system comprising a processor device, an active network device data set comprising candidate network devices as potential transfer candidates for a mobile device. At 704, an evaluation of the candidate network devices of the active network device data set is generated that comprises a network load level (e.g., an amount of MS to BS connections for a given BS), a set of parameter conditions, and/or a movement parameter of the mobile device. For example, a reward function can be determined utilizing network load level of a network device, the parameter conditions (e.g., a time delay, a capacity, past activity, predicted activities, etc.) and the movement parameter (acceleration, a direction, a speed, etc.).

At 706, the method 700 comprises determining which of the candidate network devices of the active network device data set to route network traffic of the mobile device based on a hidden markov modeling process for a network connection transfer of the mobile device. The hidden markov model, for example, can include a statistical Markov model in which the network environment being modeled is assumed to be a Markov process with unobserved (hidden) states. The determining can be based, for example, on the hidden markov modeling process that comprises selecting a candidate network device for the network connection transfer with a partially observable markov decision process. A stochastic model, such as with a partially observable markov decision process models a process where the state depends on previous states in a non-deterministic way. A stochastic process has the Markov property if the conditional probability distribution of future states of the process (conditional on both past and present values) depends only upon the present state; that is, given the present, the future does not depend on the past. Generally, this assumption enables reasoning and computation with the model that would otherwise be intractable. The hidden markov modeling process can comprise a partially observable markov decision process that generates a profile of the network load level and the set of parameter conditions for the candidate network devices based on a previous load state at a time slot and a set of previous actions corresponding to the candidate network devices. In one example, the set of previous actions comprises at least one of exceeding a capacity limit or executing an off loading event by the candidate network devices to transfer a connection of at least one mobile device connection to a different network device. The set of parameter conditions comprises at least one of a signal to noise ratio or a signal strength. Additionally, a reward function can based on at least one of a capacity, a time of the network connection transfer, or a mobility of the mobile device, of the candidate network devices with the set of parameter conditions.

Figure 8:
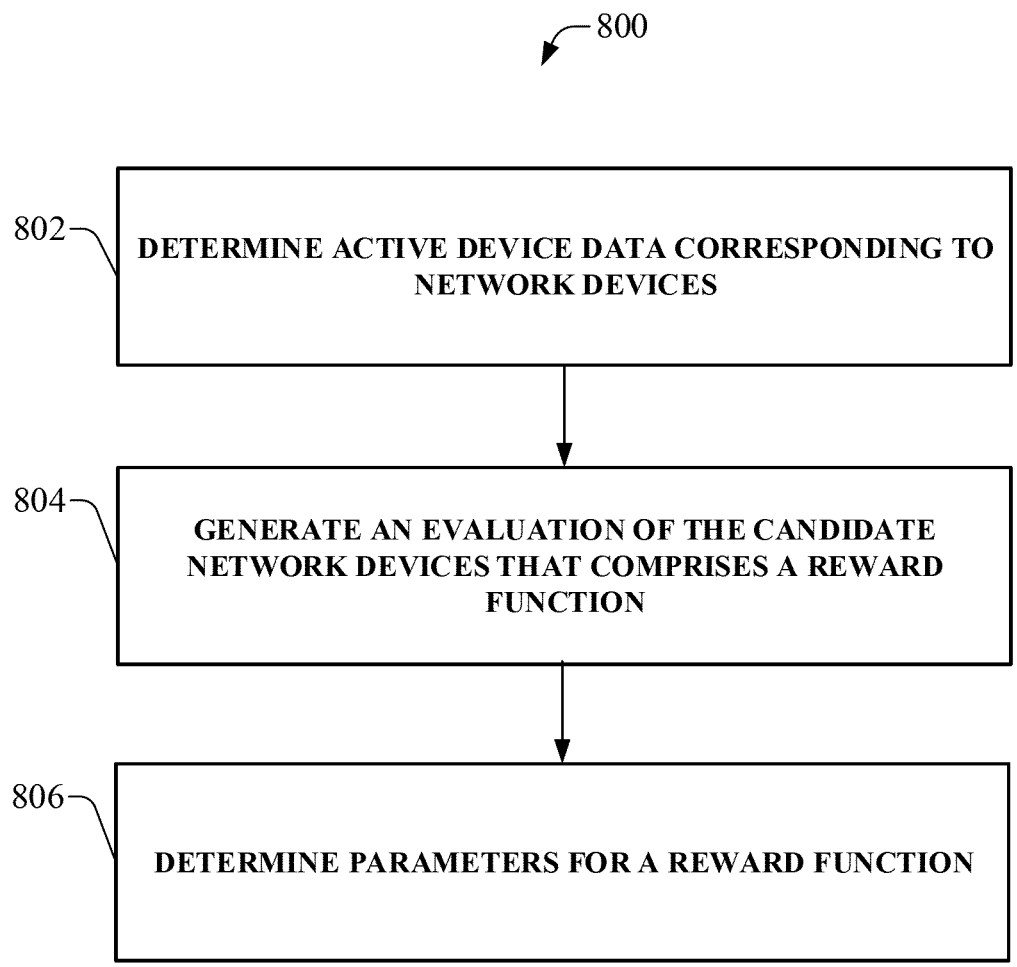
FIG. 8 illustrates another example, non-limiting method, according to an aspect.

Referring now to FIG. 8, illustrated is an example, non-limiting method 800, according to an aspect. At 802, determine active device data is determined that comprises corresponding candidate network device data to route communications for a mobile device based on a selection of at least one candidate network device for a network of the candidate network devices. At 804, an evaluation component configured to generate an evaluation of the candidate network devices of the active device data that comprises a reward function for decreasing a number of routing attempts for routing communications to a different network of the candidate network devices. Alternatively or additionally, the active device data can include a network load level for a device or the devices of the network environment.

At 806, a network parameter component is configured to determine parameters of the reward function comprising a capacity of the at least one candidate network device that is determined as a function of a total network bandwidth and respective signal-to-noise ratios for respective network device-to-mobile device links at a timeslot. The parameters can operate to parameterize the reward function and can further comprise a time cost of routing the communications to the at least one candidate network device, a mobility of the mobile device, a loading capacity of the at least one candidate network device, a current reward, a future reward of routing the communications to the at least one candidate network device, and combinations thereof. The current reward, for example, can include a function of the loading capacity of the at least one candidate network device or a time cost of routing the communications, and the future reward can include a function of a mobility of the mobile device.

Performance evaluation of the proposed schemes can be evaluated via simulations. For example, simulation parameters are illustrated in Table 1 below.

TABLE 1

SIMULATION PARAMETERS

| Parameter Type | Parameter Value |
| --- | --- |
| Separated Distance between BSs | 1.5 km |
| Number of BSs N | 20 |
| Transmit Power of BS | 46 dBm |
| Carrier Frequency | 1.9 GHz |
| Bandwidth | 10 MHz |
| Antenna Height for BS | 30 m |
| Correlation Factor κ | 50 m |
| Maximum number of connections L | 32 |
| Timeslot | 1 second |
| close-in distance $d_0$ | 100 m |

The simulation parameters of a path loss model used in equation (6) adopts the model parameters of a terrain type. The relationship between shadowing effect and the distance is simulated. In scenario 1, an mobile station (MS) moves at a constant speed v=12 m/s crossing several cell edges, or network coverage area boundaries; while in scenario 2, a random walk model is adopted for the MS with velocity between 9 m/s and 15 m/s. To avoid the ping-pong effect of switching back and forth between network devices at coverage area boundaries, an RSS-based scheme selects the new SBS when its received signal strength (RSS) is greater than the original SBS with a hysteresis threshold Δ. Two RSS-based schemes are simulated based on different settings of Δ as follows. The parameter Δ of RSS-f is fixed and equal to 3 dB while Δ of RSS-v varies along with the time cost of handover. When the time cost of handover increases, Δ is augmented in order to not spend too much time on handover process. The following equation is used to establish the relationship between $\gamma_h$ and Δ:

$$\log_2(1+\xi) = (1-\gamma_h)\log_2(1+\xi+\Delta). \tag{10}$$

The left-hand side of equality in equation (10) defines the capacity of connecting to the original SBS; while the right-hand side represents the capacity of connecting to a new SBS. Since there are three unknown parameters in (10), Δ=3 dB when $\gamma_h$=0.3 is defined to calculate the corresponding SNR value as $\xi_{ref}$. To obtain the relationships of Δ with different $\gamma_h$, equation (10) would be reformulated as $$\Delta = (1+\xi_{ref})^{\frac{1}{1-\gamma_h}} - 1 - \xi_{ref}. \tag{11}$$

RSS-v and RSS-f are the conventional schemes without cell loading information to serve as the performance benchmarks compared to the proposed schemes discussed above.

Figure 9:
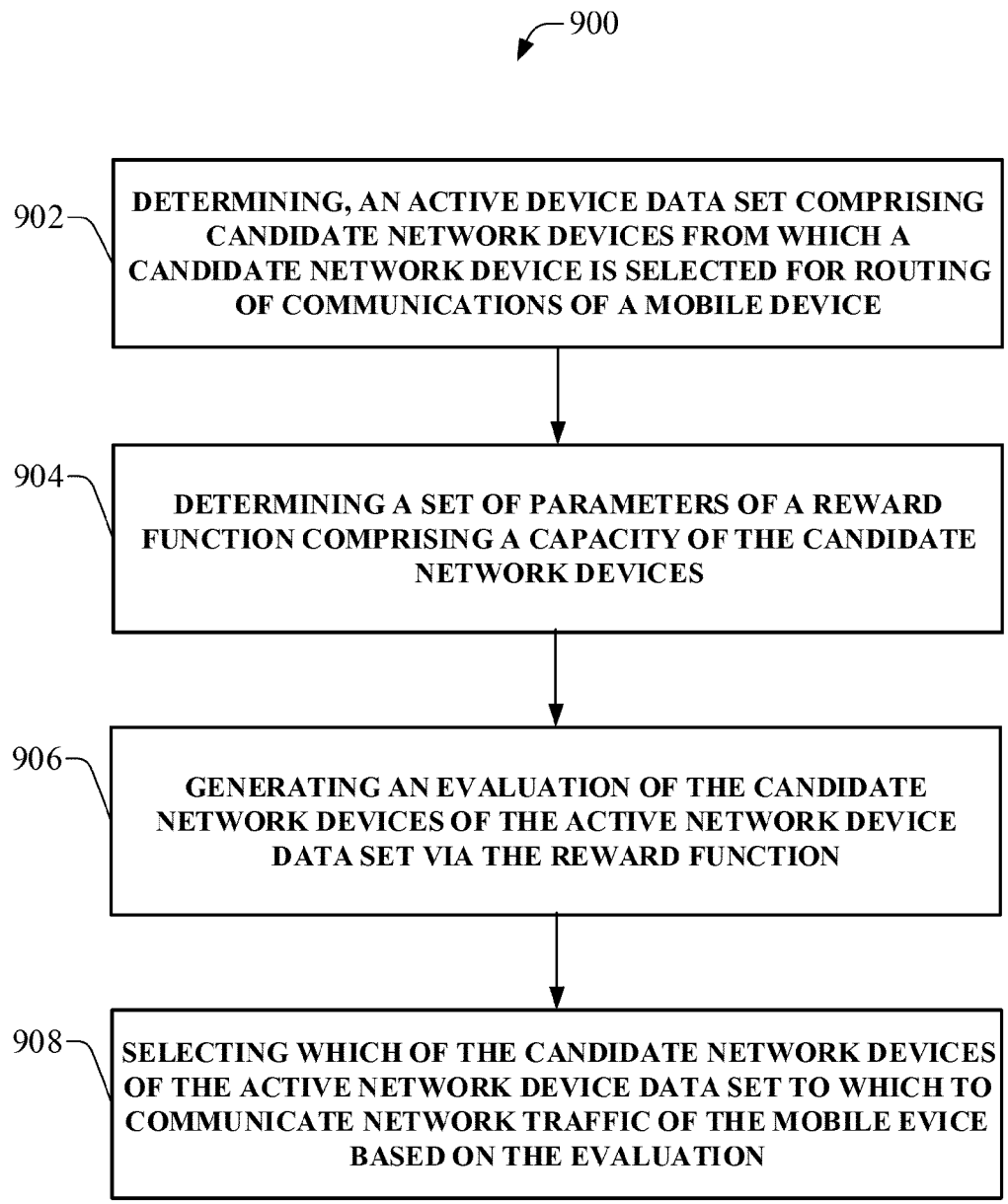
FIG. 9 illustrates another example, non-limiting method for cell selection, according to an aspect.

Referring now to FIG. 9, illustrated is another example, non-limiting method 900, according to an aspect. At 902, the method can comprise determining, by a device comprising a processing device, an active network device data set comprising candidate network devices from which a candidate network device is selected for routing of communications of a mobile device. At 904, the method can comprise determining a set of parameters of a reward function comprising a capacity of the candidate network devices. At 906, the method can comprise generating an evaluation of the candidate network devices of the active network device data set via the reward function. At 908, the method can comprise selecting which of the candidate network devices of the active network device data set to which to communicate network traffic of the mobile device based on the evaluation.

In various embodiments, the method can comprise various optional operations, such as determining the set of parameters by determining a movement parameter of the mobile device. For another example, the capacity can be determined as a function of a total network bandwidth and respective signal-to-noise ratios for respective network device-to-mobile device links. In addition, the method can comprise generating a profile of the capacity via the reward function based on a previous load state and a set of previous actions corresponding to the candidate network devices, wherein the set of previous actions comprises at least one of an exceeding of a capacity limit or an executing of an off-loading event by the candidate network devices to transfer a connection of at least one mobile device connection to a different network device.

The method can further comprise generating the reward function based on a loading state transition probability for the candidate network devices that comprises a predicted capacity of the candidate network devices based on a previous load state and a set of previous actions. Optionally, the reward function can be determined based on at least one of the capacity, a time amount of a network connection transfer, or a mobility of the mobile device, of the candidate network devices with the set of parameters.

The method can further comprise determining the set of parameters of the reward function comprising the capacity and a time cost of communicating the network traffic of the mobile device from a serving network device to the candidate network device of the candidate network devices. As another option, the set of parameters can comprise the capacity and a mobility of the mobile device. As yet another non-limiting example, the method can further comprise determining the set of parameters of the reward function comprising the capacity, a time cost of communicating the network traffic of the mobile device from a serving network device to the candidate network device of the candidate network devices, and a mobility of the mobile device.

Figure 10:
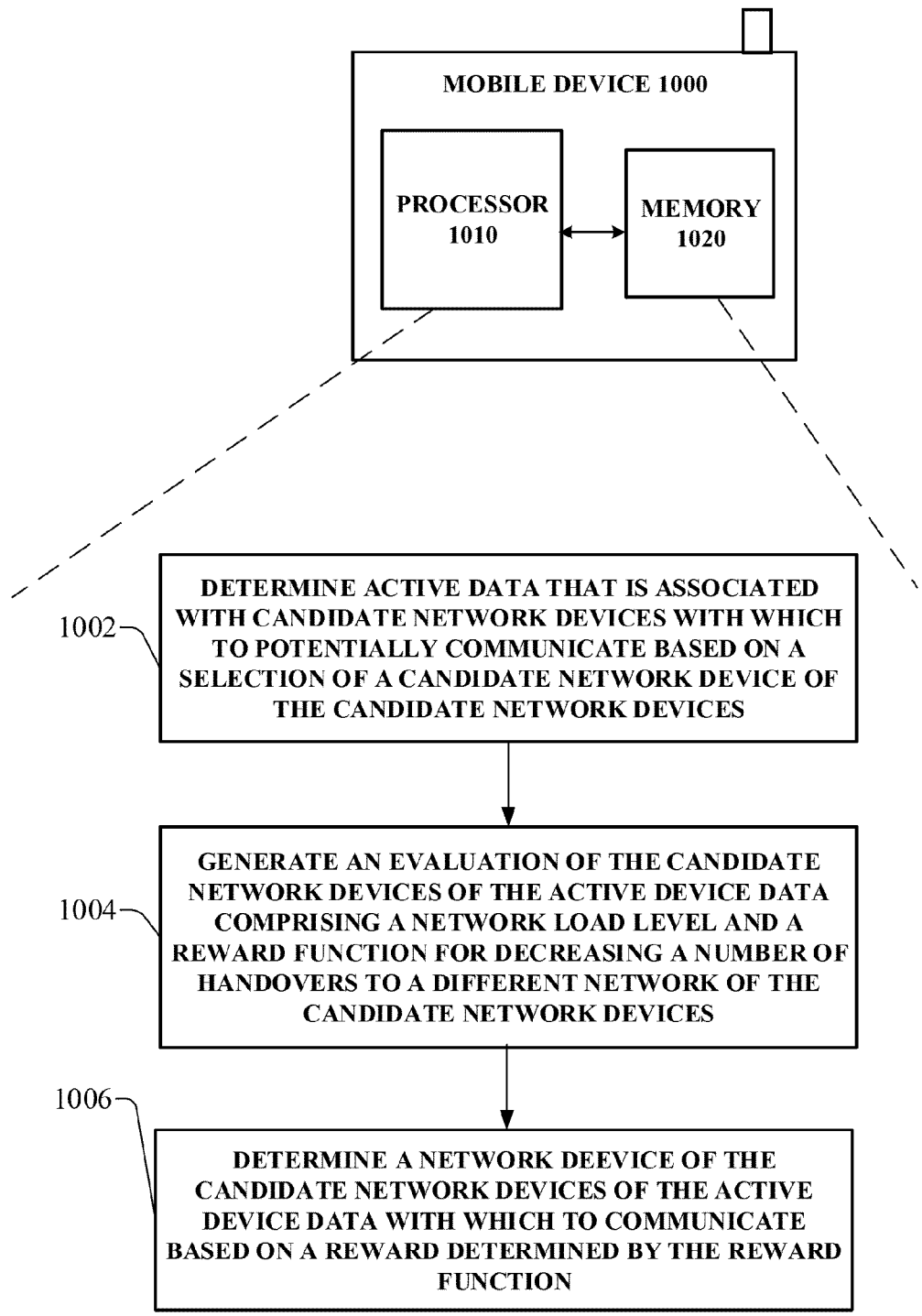
FIG. 10 illustrates an example, non-limiting mobile device and operation thereof for cell selection, according to an aspect.

Referring now to FIG. 10, illustrated is another example, non-limiting mobile device 1000, according to an aspect. The mobile device 1000 can comprise a memory 1020 storing executable instructions, and a processor 1010, coupled to the memory 1000. The processor 1010 can execute or facilitate execution of the executable instructions to at least determine active device data that is associated with candidate network devices with which to potentially communicate based on a selection of a candidate network device of the candidate network devices. The processor 1010 can execute or facilitate execution of the executable instructions to at least generate an evaluation of the candidate network devices of the active device data comprising a network load level and a reward function for decreasing a number of handovers to a different network of the candidate network devices. The processor 1010 can execute or facilitate execution of the executable instructions to at least determine a network device of the candidate network devices of the active device data with which to communicate based on a reward determined by the reward function.

In various embodiments, the processor 1010 can execute or facilitate execution of the executable instructions to perform various optional operations, such as routing communications to the network device based on a capacity according to a partially observable markov cell selection. As an option, the processor 1010 can execute or facilitate execution of the executable instructions to route communications to the network device based on a handover time according to a partially observable markov cell selection. As another option, the processor 1010 can execute or facilitate execution of the executable instructions to route communications to the network device based on a current reward at a time slot determined by the reward function, a predicted reward by the reward function and a movement measure, according to a partially observable markov cell selection. As yet another option, the processor 1010 can execute or facilitate execution of the executable instructions to route communications to the network device based on a movement measure and a handover time, according to a partially observable markov cell selection.

In an example embodiment, the network load level can comprise an observed number of connections at a time slot respectively for the candidate network devices, and a hidden markov process selects the network device of the network devices according to the reward by determining a likelihood of the observed number of connections from a historical network load level and a set of corresponding previous actions that comprise at least one of a capacity limit being exceeded or an off-loading event being respectively initiated for the candidate network devices.

Figure 11:
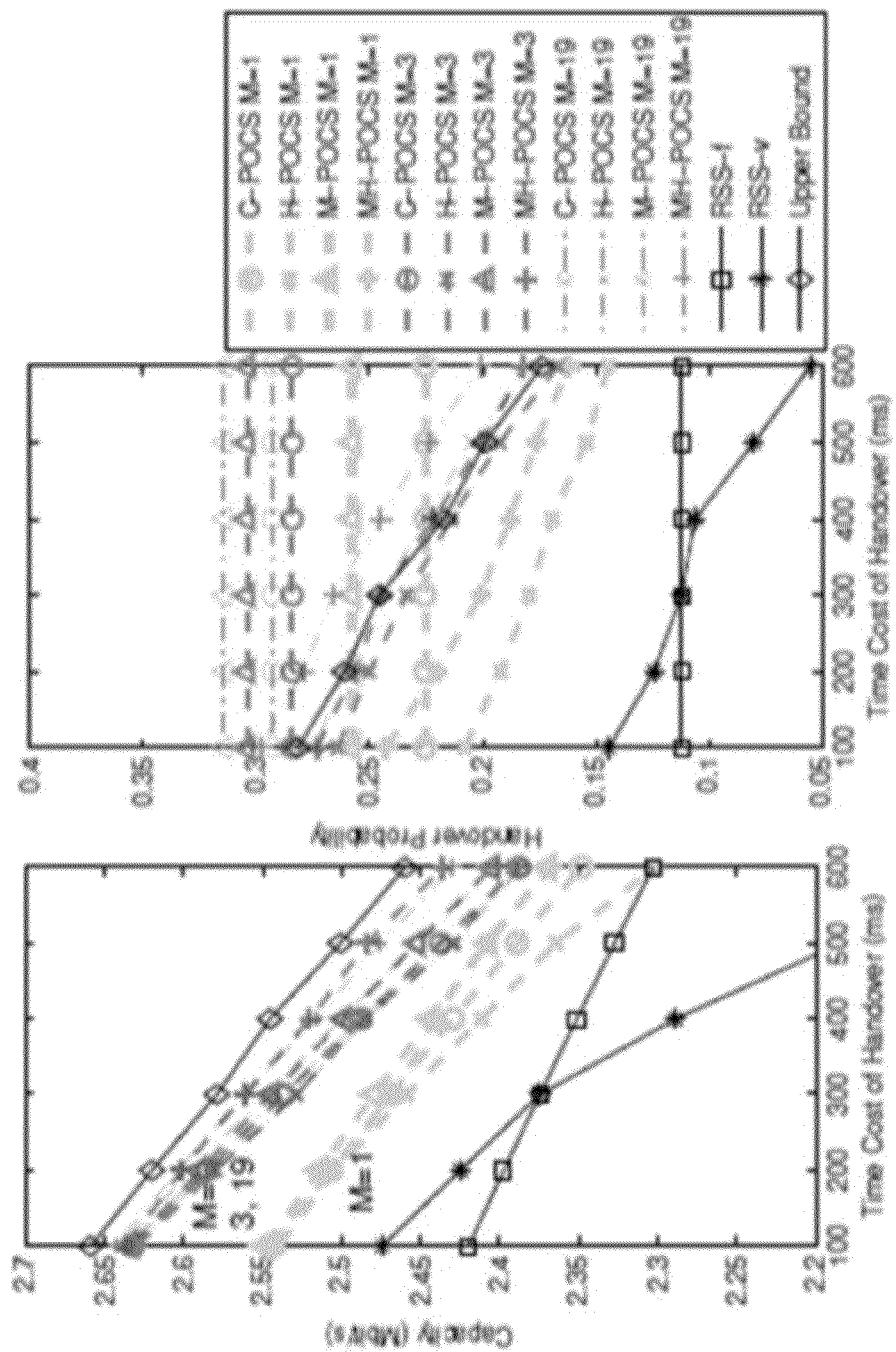
FIG. 11 illustrates a graph of a capacity and a handover probability under a time cost of a handover, according to an aspect.

Because scenario 1 considers a straight line movement where the trajectory of the MS is predictable as the MS moves in the same direction with a fixed velocity, it is shown in the left subplot of FIG. 11 that MH-POCS and M-POCS algorithms can provide a higher capacity performance than the other schemes. H-POCS and C-POCS schemes both outperform conventional RSS-based methods, and thus, demonstrate the effectiveness of HMM for cell loading under a regular movement case.

Figure 12:
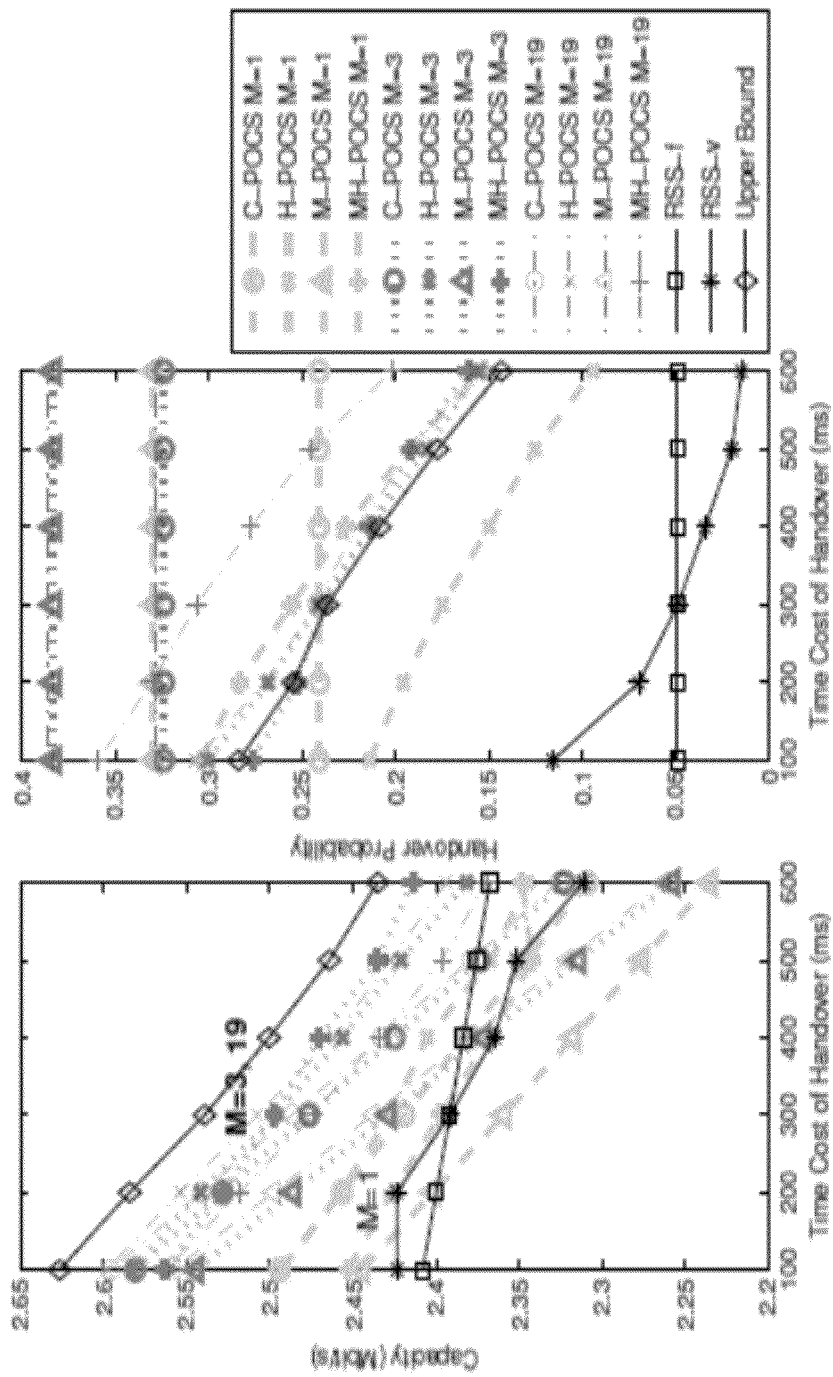
FIG. 12 illustrates a graph of a capacity and a handover probability under a time cost of a handover, according to another aspect.
Figure 13:
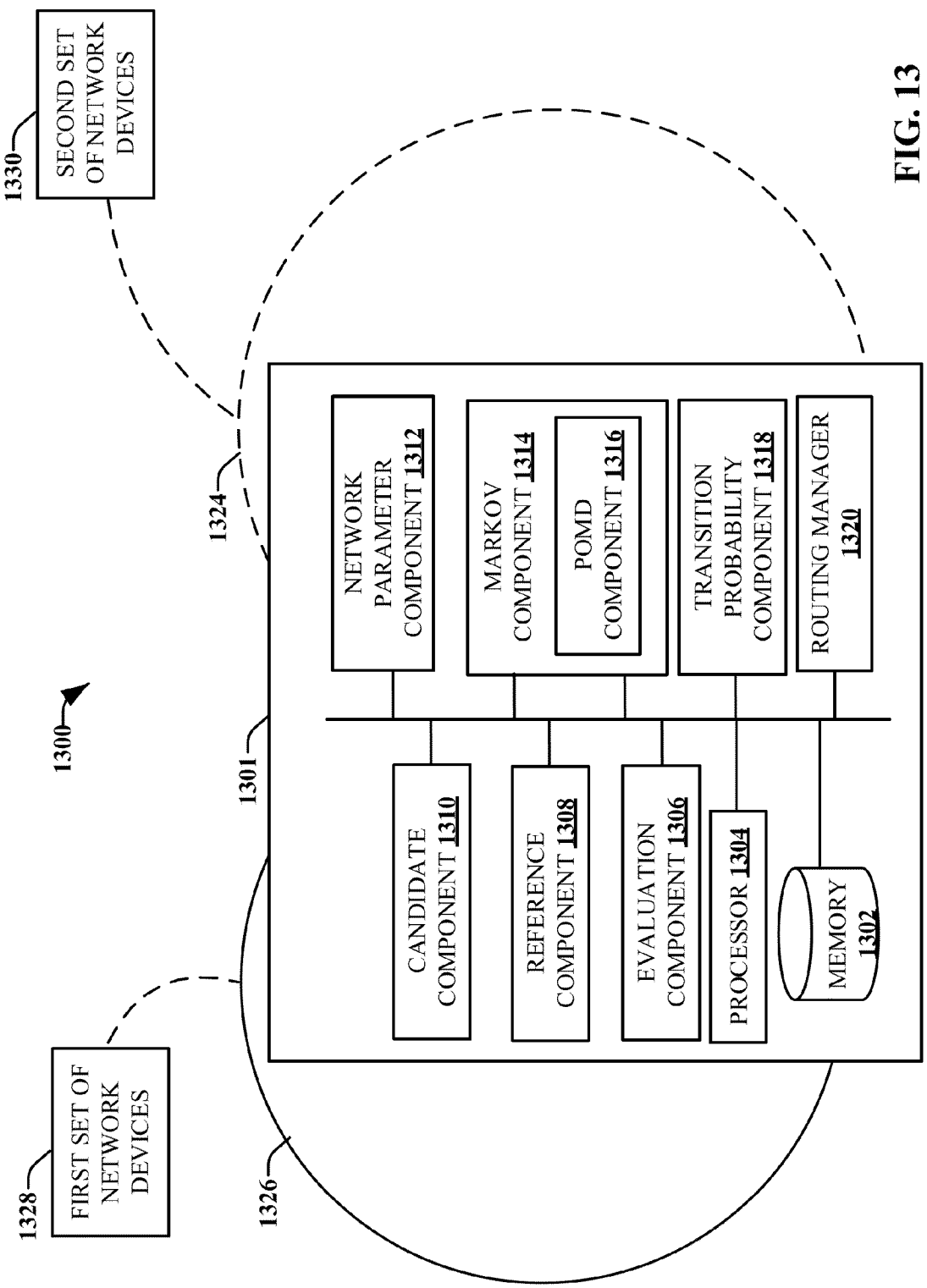
FIG. 13 illustrates an example, non-limiting system for communications with network devices for a handover process, according to an aspect.

Moreover, FIG. 12 shows scenario 2 where the MS's trajectory is no longer a line with fixed velocity due to its random walk behaviors. In the left subplot of FIG. 12, cell loading information has a significant impact on capacity when the time cost of handover is small, e.g., all POCS schemes outperform the RSS-based methods. On the other hand, with the consideration of handover time cost, both the H-POCS and MH-POCS schemes can outperform the other methods especially under larger time cost of a handover. Under the irregular movement case in scenario 2, joint considerations of cell loading and handover cost are utilized in the reward function design to achieve higher capacity such as the proposed MH-POCS scheme.

The right subplots of FIGS. 11 and 12 illustrate the result of a handover probability under different time costs of a handover. Since C-POCS, M-POCS, and RSS-f do not consider the impact of different handover time costs, their handover probabilities are not influenced by the time cost of handover. The MPOCS scheme predicts the future reward and the tendency of capacity variations results in the highest handover probability. Moreover, with the consideration of handover time cost, the handover probabilities of H-POCS, MH-POCS, and RSS-v methods decrease as the time cost of handover rises. This result is considered reasonable since higher handover cost which penalizes the capacity makes the MS reluctant to perform handover. A crossover point at 300 ms exists between the RSS-v and RSS-f methods due to the derivation of $\xi_{ref}$ from equation (11) above.

The effect on the number of SBS candidates in the active set M is also simulated in both scenarios. To validate the gain of cell loading information to this cell selection problem, an MDP case M=N=20 is considered the upper bound of all the POCS schemes. The cost function of this upper bound is taken to be the same as MH-POCS scheme in (10), which outperforms all other cases in the simulation. The case M=1 indicates that only one BS is in the active set and selected as the SBS. It is intuitive to observe worse performance in this case compared to the cases with larger M values since the cell loading from other BSs can only be predicted based on HMM. The case with M=3 in a regular cell deployment can provide satisfactory performance since at most three BSs are located around the same distances to MS. This case also validates the need of the active set design for the cell selection schemes compared to the case with M=1. Moreover, it can be observed in both FIGS. 11 and 12 that the cases with M=3 and 19 result in similar performance which demonstrates that the number of active set can be chosen as M=3 with the consideration of tradeoff between computational complexity and capacity performance.

The POMDP-based cell selection (POCS) methods are thus designed to consider both cell loading and mobility to achieve higher network capacity. Four versions of POCS schemes have been proposed, including the C-POCS, HPOCS, M-POCS, and MH-POCS algorithms, which consider capacity, handover time, mobility of the mobile device and mobility of MS with handover time, respectively. Based on the simulation results, it can be observed that MH-POCS scheme can outperform the other methods, while M-POCS scheme achieves similar performance under linear MS movement. Compared to conventional RSS-based schemes, higher system capacity can be achieved by the C-POCS method. Moreover, with slight degradation on capacity performance, H-POCS scheme decreases handover probability which can effectively alleviate the ping-pong effect. It can also be observed from simulation results that a small number of BSs in the active set, e.g., M=3, can achieve satisfactory performance for the cell selection problem.

Next, it is illustrated how to apply the various POCS embodiments described herein for cell selection and handover procedures in LTE-A systems. In the 3GPP terminology, cell selection and handover are two distinct procedures. Cell selection, which is initiated from the MS, takes place when the MS is in its idle mode and the MS will decide on which BS to camp. In other words, either cell selection or re-selection will occur as long as the MS is idle and moves from cell to cell. In this section, we will firstly explain the implementation of proposed POCS scheme for cell selection and re-selection in LTE-A networks. On the other hand, handover takes place when the MS is in active mode and moves from cell to cell. The network decides to which BS the UE will switch, so as to provide seamless service for the MS. An embodiment of POMDP-based handover for LTE-A system is also described, nicknamed POH in the following subsections.

With regard to cell selection, according to LTE-A systems, the MS will execute cell selection or cell re-selection procedure to find a suitable cell after power-on or link loss. Therefore, the proposed POCS embodiments, which measure SNR and observe cell loading information, can be implemented at the MS side of the LTE-A network in order to provide a feasible decision for cell selection or re-selection. With some adjustments on frame structure, the POCS embodiments that utilize MS's mobility and handover cost can also be implemented as cell selection procedures for an LTE-A system.

With regard to handover, handover in LTE-A system is a network control mechanism. Measurements are made and reported by the MS to the network, which will then select the target cell for the MS. The MS measures reference signals (RS) of neighbor BSs for both SNR calculation and mobility prediction in the POH embodiments. Two types of measurement reports are adopted in the LTE-A system as follows. The MS can periodically report the measured information for SNR calculation and mobility prediction based on predefined timer. On the other hand, the serving BS sends measurement control messages to the MS in order to trigger the measurement report sending from the MS. Note that the following threshold comparison can be included at the first stage of proposed POCS/POH scheme in order to avoid unnecessary decisions when signal quality is good enough. The POH embodiment will be initiated if the serving BS found the reported reference signal receive power (RSRP) from MS dropped below a threshold $T_r$, e.g., $$T_r = Q_{s,mea} - (Q_{min} - Q_A) < 0, \quad (13)$$

where $Q_{min}$ is the minimum receive signal level in the cell. $Q_{s,mea}$ is the RSRP of serving BS, and $Q_A$ is the offset to avoid a ping-pong effect. Afterwards, the network decides if the MS is to handover to other cells based on (3) and negotiates with the neighbor BSs. The cell loading information is exchanged between BSs through an X2 interface, which is defined in LTE-A networks. Providing that the cell loading information is exchanged between BSs in a current timeslot, this information is updated whereas the initial state of HMM is reset. On the other hand, if cell loading of a neighbor BS is not exchanged in the current timeslot, this information can be predicted based on the HMM. Therefore, the cell loading information is maintained by the BS and can be updated based on the HMM by adopting the presently described POH embodiment. According to the reported RSRP from the MS, the network can decide the next target BS for the MS as formulated in (3).

In an embodiment, a system 1301 in a wireless network environment 1300 comprises a memory 1302 storing executable components, and a processor 1304, communicatively coupled to the memory 1302, that executes or facilitates execution of the executable components. The executable components can comprise a candidate component 1310 configured to determine active device data corresponding to a first set of network devices 1328 and a second set of network devices 1330 to use for transfer of communications of a mobile device based on a selection of a network device from among the first set of network devices 1328 and the second set of network devices 1330. the first set of network devices 1328 and the second set of network devices 1330 can have coverage 1326 and 1324, respectively. The executable components can comprise an evaluation component 1306 configured to generate an evaluation via a reward function to perform the transfer of the communications of the mobile device in a handover process. The executable components can further comprise a network parameter component 1312 configured to determine a set of parameters for the reward function comprising a first network load level and a second network load level based on a current capacity that comprises a current number of connections for the first set of network devices 1328 and the second set of network devices 1330.

Various embodiments of the network parameter component 1312 can include different options. For instance, the network parameter component 1312 can be further configured to determine the first network load level and the second network load level based on a network device loading state transition probability determined from a corresponding previous load state and a set of corresponding previous network device actions of the first set of network devices 1328 and the second set of network devices 1330.

Various embodiments of the evaluation component 1306 can include different options as well. For example, the evaluation component 1306 can be further configured to evaluate a first set of network parameter conditions of the first set of network devices 1328 and a second set of network parameter conditions of the second set of network devices 1330 by the reward function based on a mobility parameter of the mobile device and at least one of a network device capacity and a frequency of connection transfers. As another example, the evaluation component 1306 can be further configured to evaluate a first set of network parameter conditions of the first set of network devices 1328 and a second set of network parameter conditions of the second set of network devices 1330, via the reward function, that respectively comprises a capacity that is a function of a total network bandwidth and respective signal-to-noise ratios for network device-to-mobile device of the first set of network devices 1328 and the second set of network devices 1330.

The evaluation component 1306 can be further configured to evaluate a first set of network parameter conditions of the first set of network devices 1328 and a second set of network parameter conditions of the second set of network devices 1330, via the reward function, that respectively comprises a connection transfer time that is determined as a function of a penalty of a transfer of a connection of the mobile device that is represented by a timeslot ratio of a timeslot, a total network bandwidth, and respective signal-to-noise ratios for network device-to-mobile device connections.

As yet another example, the evaluation component 1306 can be further configured to evaluate a first set of network parameter conditions of the first set of network devices 1328 and a second set of network parameter conditions of the second set of network devices 1330, via the reward function, comprising a mobility of the mobile device and a time of a transfer of a connection that is determined as a function of a simulated time interval of a continuous movement parameter of the mobile device over a change of time in a set of simulated time intervals, a penalty of the transfer of the connection of the mobile device that is represented by a timeslot ratio of a timeslot, a total network bandwidth, and respective signal-to-noise ratios for respective network device-to-mobile device connections.

Alternatively, the evaluation component 1306 can be further configured to evaluate a first set of network parameter conditions of the first set of network devices 1328 and a second set of network parameter conditions of the second set of network devices 1330, via the reward function, comprising a non-fixed signal-to-noise ratio that is based on a current reward of a transfer of a connection to the first set of network devices 1328 or the second set of network devices 1330 and a predicted reward. The current reward can be a function of a capacity at a timeslot for the transfer of the connection and the predicted reward can be a function of a path loss estimated at a distance for the transfer of the connection at the timeslot.

The executable components can further comprise a reference component 1308 configured to determine a reference signal for the first set of network devices 1328 and the second set of network devices 1330, and generate a determination of whether a reported reference signal satisfies a threshold condition to facilitate another handover process among the first set of network devices 1328 and the second set of network devices 1330.

The executable components can further comprise a markov component 1314 configured to determine, based on the evaluation, the network device of the first set of network devices 1328 and the second set of network devices 1330 to use to route network traffic from the mobile device based on the reward function being determined from a hidden markov model. In this regard, the reference signal can comprise a signal-to-noise ratio and a mobility prediction of the mobile device, and the threshold condition can be a function of a minimum receive signal of the first set of network devices 1328 and the second set of network devices 1330. The markov component 1314 can also be a partially observable markov decision component configured to account for a set of defined uncertainties in the first network load level and the second network load level.

The executable components can further comprise a transition probability component 1318 configured to generate a network device loading state transition probability based on a set of previous network device load states at a defined time slot and a set of previous network device actions, respectively associated with the first set of network devices 1328 and the second set of network devices 1330.

Figure 14:
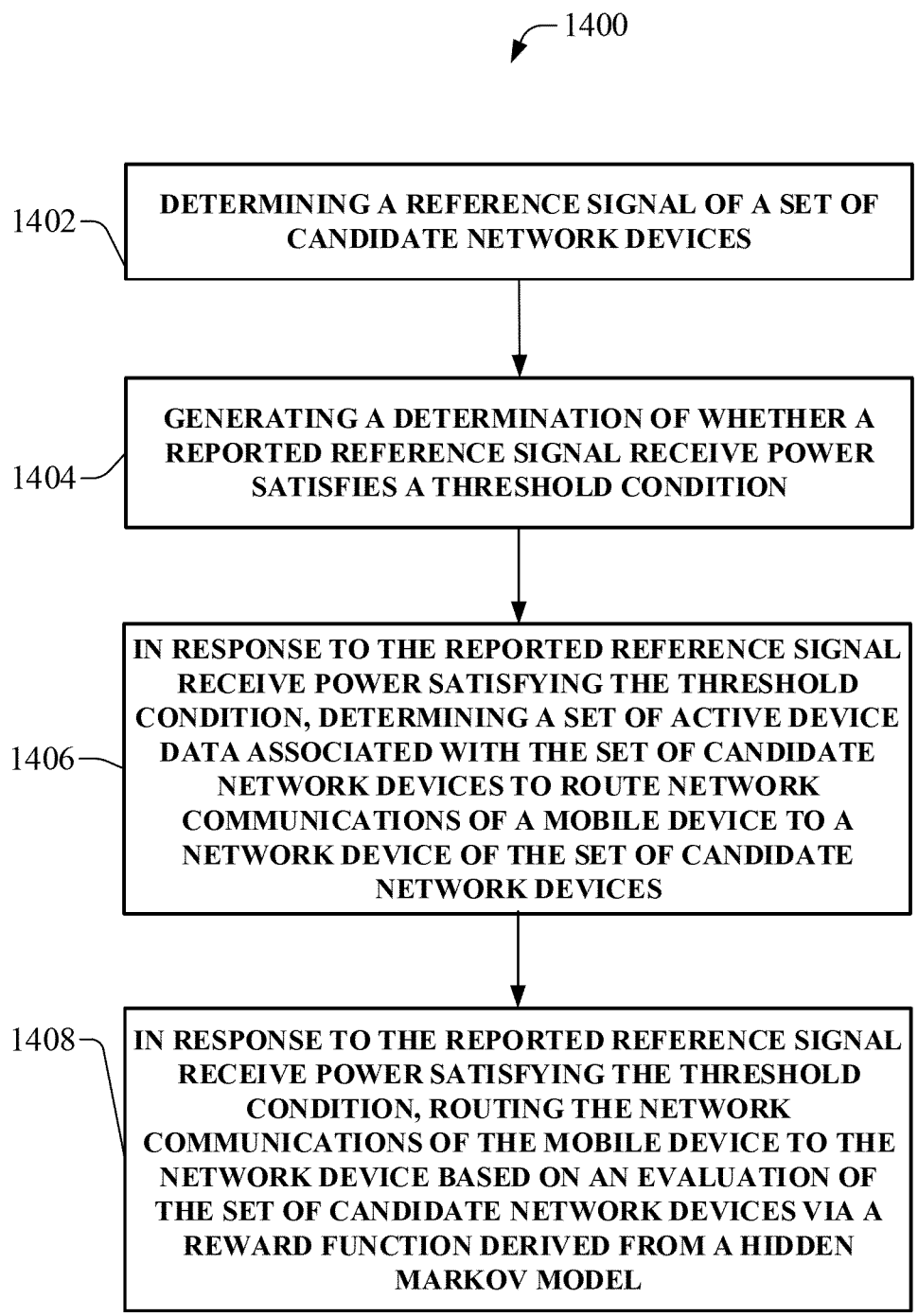
FIG. 14 illustrates another example, non-limiting method for a handover process, according to an aspect.

Referring now to FIG. 14, illustrated is another example, non-limiting method 1400, according to an aspect. At 1402, the method can comprise determining, by a device comprising a processing device, a reference signal of a set of candidate network devices. The method can further comprise at 1404 generating a determination of whether a reported reference signal receive power satisfies a threshold condition. In addition, in response to the reported reference signal receive power satisfying the threshold condition, the method can comprise, at 1406, determining a set of active device data associated with the set of candidate network devices to route network communications of a mobile device to a network device of the set of candidate network devices, and also in response to the reported reference signal receive power satisfying the threshold condition, at 1408, routing the network communications of the mobile device to the network device based on an evaluation of the set of candidate network devices via a reward function derived from a hidden markov model.

The hidden markov model can be a function of a predicted network device load and an active network device load, corresponding to the set of candidate network devices of the set of active device data. In addition, the method can further comprise determining the reward function based on at least one of a capacity, a time of a network connection transfer, or a mobility of the mobile device, of the set of candidate network devices.

The method can also comprise generating a signal-to-noise ratio and a mobility prediction derived from the reference signal of the set of candidate network devices. The method can further comprise communicating the signal-to-noise ratio and the mobility prediction derived from the reference signal of the set of candidate network devices based on a predefined period of time.

Alternatively, the method can comprise communicating the signal-to-noise ratio and the mobility prediction derived from the reference signal of the set of candidate network devices in response to a measurement control message.

The method can also optionally comprise generating a profile of an active network load for the set of candidate network devices via a partially observable markov decision process of the hidden markov model that is based on a previous load state at a time slot and a set of previous actions of the set of candidate network devices. The set of previous actions can comprise at least one of exceeding a capacity limit or executing an off-loading event by the set of candidate network devices to transfer a connection of at least one mobile device connection to a different network device.

The method can further comprise generating another determination of whether candidate network devices of the set of candidate network devices have exchanged network device load data.

The method can further comprise generating the hidden markov model as a function of a predicted network device load that is generated in response to the determination indicating that the set of candidate network devices have not exchanged network device load data, wherein the predicted network device load is a function of a probability of a network device loading state based on a previous load state at a time slot and a set of previous actions of the set of candidate network devices.

Figure 15:
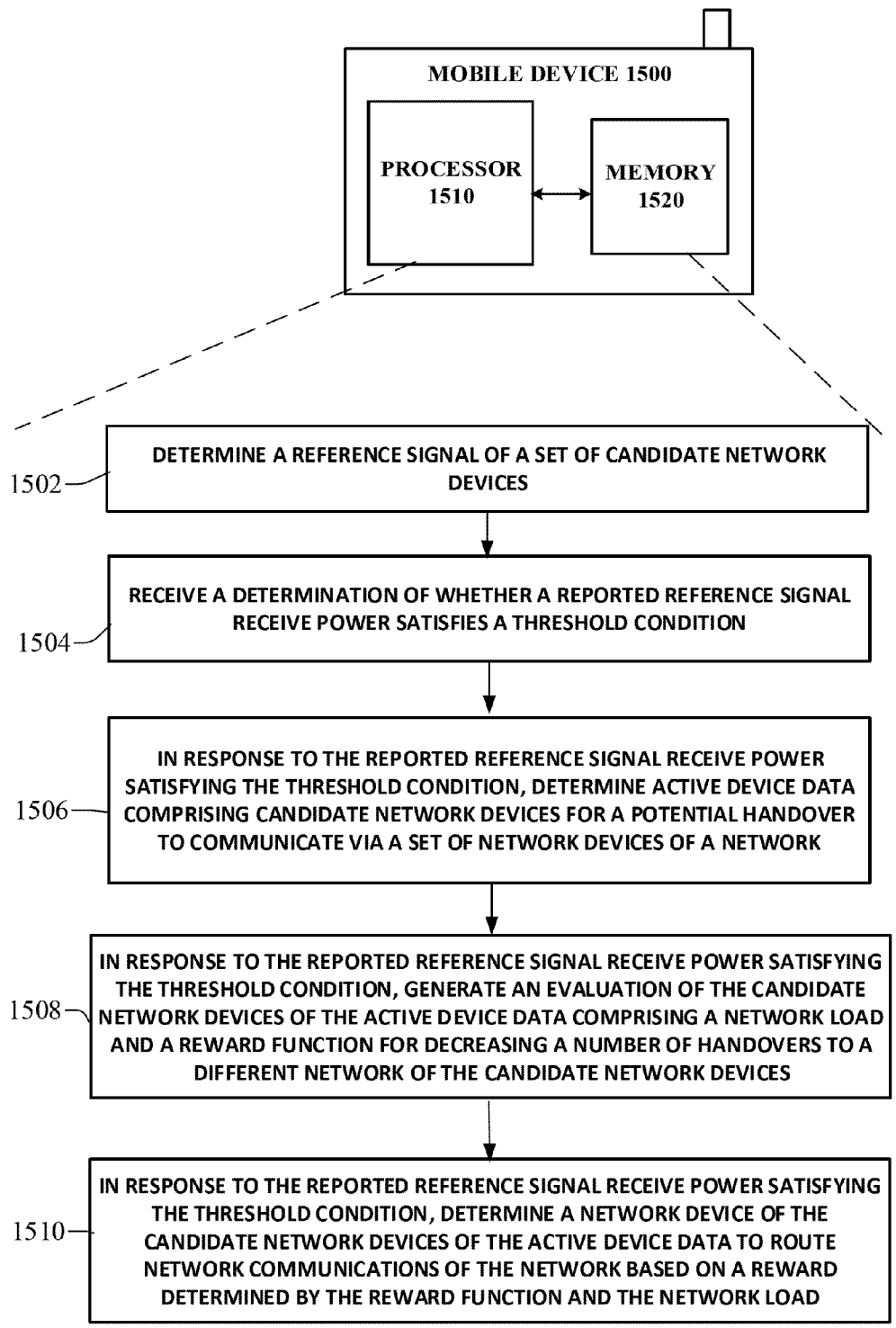
FIG. 15 illustrates an example, non-limiting mobile device and operation thereof for a handover process, according to an aspect.

Referring now to FIG. 15, illustrated is another example, non-limiting mobile device 1500, according to an aspect. The mobile device 1500 can comprise a memory 1520 storing executable instructions, and a processor 1510, coupled to the memory 1500. The processor 1510 can execute or facilitate execution of the executable instructions to at least, at 1502, determine a reference signal of a set of candidate network devices and, at 1504, receive a determination of whether a reported reference signal receive power satisfies a threshold condition. In addition, in response to the reported reference signal receive power satisfying the threshold condition, the processor 1510 can execute or facilitate execution of the executable instructions to, at 1506, determine active device data comprising candidate network devices for a potential handover to communicate via a set of network devices of a network, at 1508, generate an evaluation of the candidate network devices of the active device data comprising a network load and a reward function for decreasing a number of handovers to a different network of the candidate network devices, and, at 1510, determine a network device of the candidate network devices of the active device data to route network communications of the network based on a reward determined by the reward function and the network load.

Various embodiments present additional embodiments for the mobile device 1500. For instance, the processor 1510 can execute or facilitate execution of the executable instructions to route the network communications to the network device based on a capacity according to a partially observable markov cell selection of a hidden markov process that selects the network device according to the reward and the network load. Further, the processor 1510 can execute or facilitate execution of the executable instructions to route the network communications to the network device based on a handover time according to a partially observable markov cell selection.

As another alternative, the network communications can be routed to the network device based on a current reward at a time slot determined and a predicted reward via the reward function and a movement measure of the mobile device, according to a partially observable markov cell selection. Or, instead, the network communications can be routed to the network device based on a movement measure and a handover time, according to a partially observable markov cell selection. For other example embodiments, the network load can comprise an observed number of connections at a time slot respectively for the candidate network devices, and a hidden markov process can select the network device according to the reward and the network load using a likelihood of the observed number of connections from a historical network load level and a set of corresponding previous actions that comprise at least one of exceeding a capacity limit or respective off-loading events for the candidate network devices.

Figure 16:
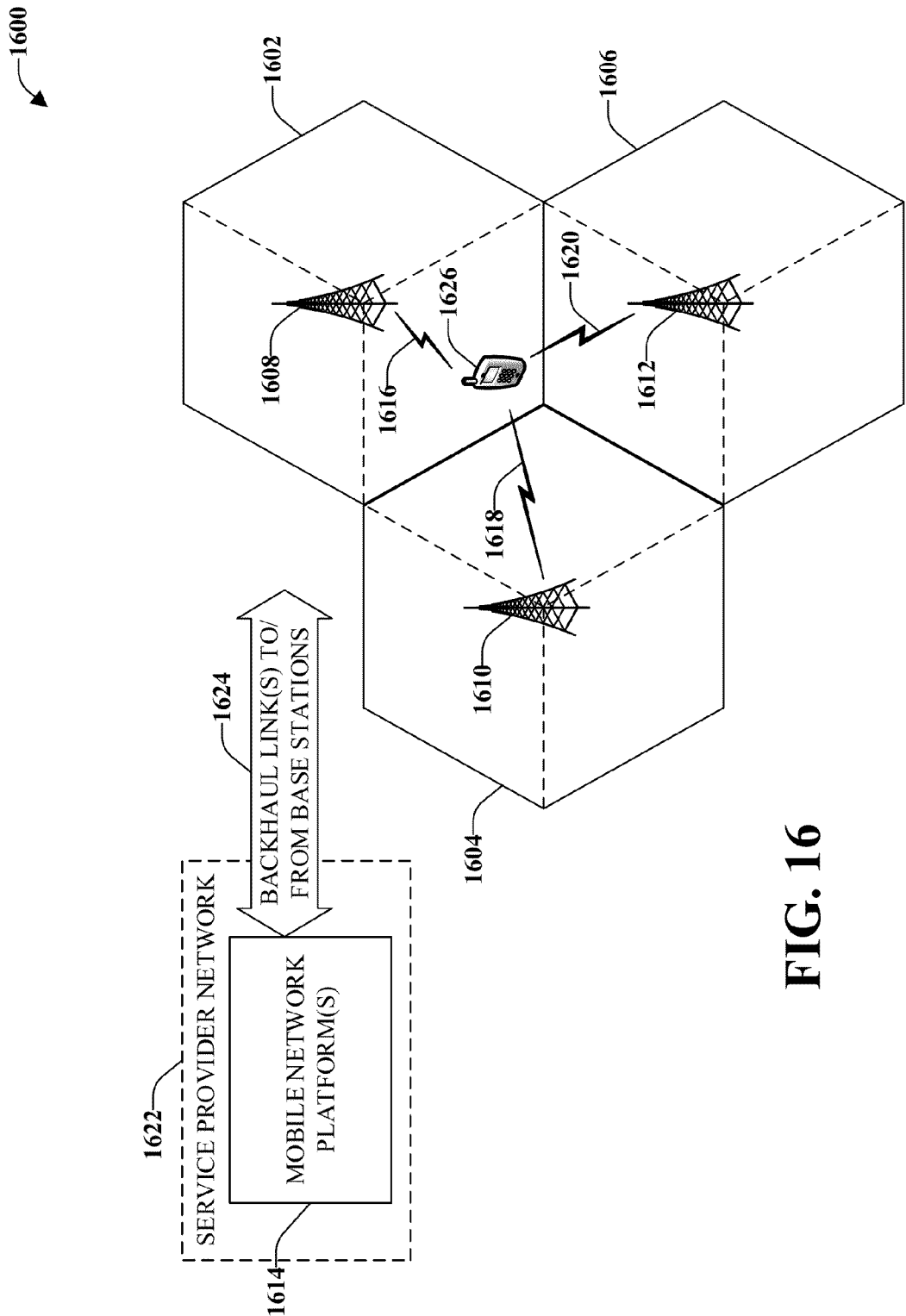
FIG. 16 is a schematic example wireless environment that can operate in accordance with aspects described herein.

By way of further description with respect to one or more non-limiting ways to facilitate network traffic routing selection, FIG. 16 is a schematic example wireless environment 1600 that can operate in accordance with aspects described herein. In particular, example wireless environment 1600 illustrates a set of wireless network macro cells. Three coverage macro cells 1602, 1604, and 1606 include the illustrative wireless environment; however, it is noted that wireless cellular network deployments can encompass any number of macro cells. Coverage macro cells 1602, 1604, and 1606 are illustrated as hexagons; however, coverage cells can adopt other geometries generally dictated by a deployment configuration or floor plan, geographic areas to be covered, and so on. Each macro cell 1602, 1604, and 1606 is sectorized in a $2\pi/3$ configuration in which each macro cell includes three sectors, demarcated with dashed lines in FIG. 16. It is noted that other sectorizations are possible, and aspects or features of the disclosed subject matter can be exploited regardless of type of sectorization. Macro cells 1602, 1604, and 1606 are served respectively through base stations 1608, 1610, and 1612. Any two BSs can be considered a BS site pair. It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 1614, and set of base stations (e.g., 1608, 1610, and 1612) that serve a set of macro cells; electronic circuitry or components associated with the base stations in the set of base stations; a set of respective wireless links (e.g., links 1616, 1618, and 1620) operated in accordance to a radio technology through the base stations, form a macro radio access network. It is further noted that, based on network features, the radio controller can be distributed among the set of base stations or associated radio equipment. In an aspect, for universal mobile telecommunication system-based networks, wireless links 1616, 1618, and 1620 embody a Uu interface (universal mobile telecommunication system Air Interface).

Mobile network platform(s) 1614 facilitates circuit switched-based (e.g., voice and data) and packet-switched (e.g., Internet protocol, frame relay, or asynchronous transfer mode) traffic and signaling generation, as well as delivery and reception for networked telecommunication, in accordance with various radio technologies for disparate markets. Telecommunication is based at least in part on standardized protocols for communication determined by a radio technology utilized for communication. In addition, telecommunication can exploit various frequency bands, or carriers, which include any electromagnetic frequency bands licensed by the service provider network 1622 (e.g., personal communication services, advanced wireless services, general wireless communications service, and so forth), and any unlicensed frequency bands currently available for telecommunication (e.g., the 2.4 GHz industrial, medical and scientific band or one or more of the 5 GHz set of bands). In addition, mobile network platform(s) 1614 can control and manage base stations 1608, 1610, and 1612 and radio component(s) associated thereof, in disparate macro cells 1602, 1604, and 1606 by way of, for example, a wireless network management component (e.g., radio network controller(s), cellular gateway node(s), etc.). Moreover, wireless network platform(s) can integrate disparate networks (e.g., Wi-Fi network(s), broadband network(s), service network(s), enterprise network(s), and so on). In cellular wireless technologies (e.g., third generation partnership project universal mobile telecommunication system, global system for mobile communication, mobile network platform 1614 can be embodied in the service provider network 1622.

In addition, wireless backhaul link(s) 1624 can include wired link components such as T1/E1 phone line; T3/DS3 line, a digital subscriber line either synchronous or asynchronous; an asymmetric digital subscriber line; an optical fiber backbone; a coaxial cable, etc.; and wireless link components such as line-of-sight or non-line-of-sight links which can include terrestrial air-interfaces or deep space links (e.g., satellite communication links for navigation). In an aspect, for universal mobile telecommunication system-based networks, wireless backhaul link(s) 1624 embodies IuB interface.

It is noted that while exemplary wireless environment 1600 is illustrated for macro cells and macro base stations, aspects, features and advantages of the disclosed subject matter can be implemented in micro cells, pico cells, femto cells, or the like, wherein base stations are embodied in home-based equipment related to access to a network.

Figure 17:
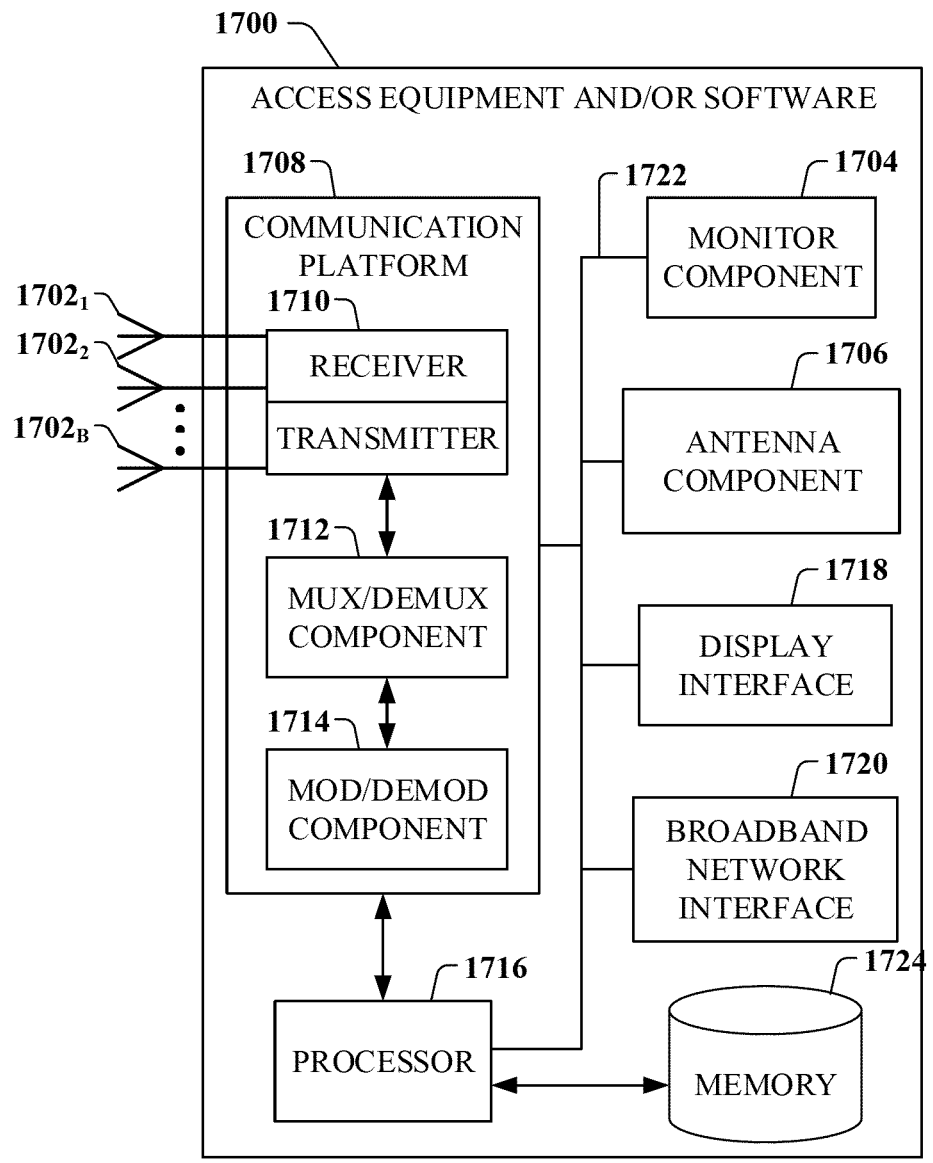
FIG. 17 illustrates a block diagram of access equipment and/or software related to access of a network, in accordance with an embodiment.

To provide further context for various aspects of the disclosed subject matter, FIG. 17 illustrates a block diagram of an embodiment of access equipment and/or software 1700 related to access of a network (e.g., base station, wireless access point, femtocell access point, and so forth) that can enable and/or exploit features or aspects of the disclosed aspects.

Access equipment and/or software 1700 related to access of a network can receive and transmit signal(s) from and to wireless devices, wireless ports, wireless routers, etc. through segments 1702$_1$-1702$_B$ (B is a positive integer). Segments 1702$_1$-1702$_B$ can be internal and/or external to access equipment and/or software 1700 related to access of a network, and can be controlled by a monitor component 1704 and an antenna component 1706. Monitor component 1704 and antenna component 1706 can couple to communication platform 1708, which can include electronic components and associated circuitry that provide for processing and manipulation of received signal(s) and other signal(s) to be transmitted.

In an aspect, communication platform 1708 includes a receiver/transmitter 1710 that can convert analog signals to digital signals upon reception of the analog signals, and can convert digital signals to analog signals upon transmission. In addition, receiver/transmitter 1710 can divide a single data stream into multiple, parallel data streams, or perform the reciprocal operation. Coupled to receiver/transmitter 1710 can be a multiplexer/demultiplexer 1712 that can facilitate manipulation of signals in time and frequency space. Multiplexer/demultiplexer 1712 can multiplex information (data/traffic and control/signaling) according to various multiplexing schemes such as time division multiplexing, frequency division multiplexing, orthogonal frequency division multiplexing, code division multiplexing, space division multiplexing. In addition, multiplexer/demultiplexer component 1712 can scramble and spread information (e.g., codes, according to substantially any code known in the art, such as Hadamard-Walsh codes, Baker codes, Kasami codes, polyphase codes, and so forth).

A modulator/demodulator 1714 is also a part of communication platform 1708, and can modulate information according to multiple modulation techniques, such as frequency modulation, amplitude modulation (e.g., M-ary quadrature amplitude modulation, with M a positive integer); phase-shift keying; and so forth).

Access equipment and/or software 1700 related to access of a network also includes a processor 1716 configured to confer, at least in part, functionality to substantially any electronic component in access equipment and/or software 1700. In particular, processor 1716 can facilitate configuration of access equipment and/or software 1700 through, for example, monitor component 1704, antenna component 1706, and one or more components therein. Additionally, access equipment and/or software 1700 can include display interface 1718, which can display functions that control functionality of access equipment and/or software 1700, or reveal operation conditions thereof. In addition, display interface 1718 can include a screen to convey information to an end user. In an aspect, display interface 1718 can be a liquid crystal display, a plasma panel, a monolithic thin-film based electrochromic display, and so on. Moreover, display interface 1718 can include a component (e.g., speaker) that facilitates communication of aural indicia, which can also be employed in connection with messages that convey operational instructions to an end user. Display interface 1718 can also facilitate data entry (e.g., through a linked keypad or through touch gestures), which can cause access equipment and/or software 1700 to receive external commands (e.g., restart operation).

Broadband network interface 1720 facilitates connection of access equipment and/or software 1700 to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 1720 can be internal or external to access equipment and/or software 1700, and can utilize display interface 1718 for end-user interaction and status information delivery.

Processor 1716 can be functionally connected to communication platform 1708 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 1716 can be functionally connected, through data, system, or an address bus 1722, to display interface 1718 and broadband network interface 1720, to confer, at least in part, functionality to each of such components.

In access equipment and/or software 1700, memory 1724 can retain location and/or coverage area (e.g., macro sector, identifier(s)) access list(s) that authorize access to wireless coverage through access equipment and/or software 1700, sector intelligence that can include ranking of coverage areas in the wireless environment of access equipment and/or software 1700, radio link quality and strength associated therewith, or the like. Memory 1724 also can store data structures, code instructions and program modules, system or device information, code sequences for scrambling, spreading and pilot transmission, access point configuration, and so on. Processor 1716 can be coupled (e.g., through a memory bus), to memory 1724 in order to store and retrieve information used to operate and/or confer functionality to the components, platform, and interface that reside within access equipment and/or software 1700.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in memory 1724, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Figure 18:
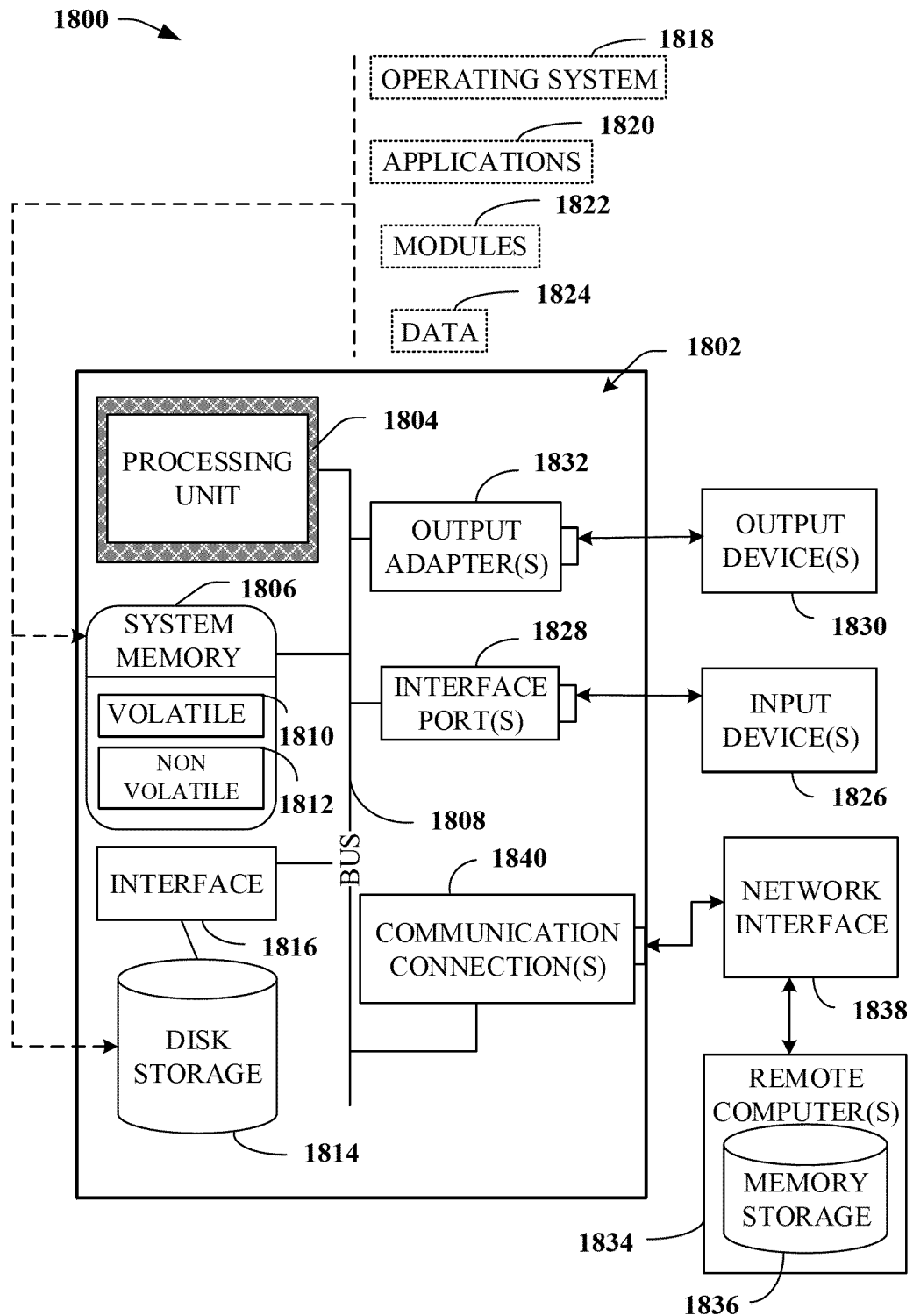
FIG. 18 illustrates a block diagram of a computing system, in accordance with an embodiment.

In order to provide a context for the various aspects of the disclosed subject matter, FIG. 18, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the various aspects also can be implemented in combination with other program modules. Generally, program modules include routines, programs, components, data structures, etc. that performs particular tasks and/or implement particular abstract data types. For example, in memory there can be software, which can instruct a processor to perform various actions. The processor can be configured to execute the instructions in order to implement the analysis of monitoring an uplink power level, detecting the uplink power level is at or above a threshold level, and/or disable transmission of at least one message as a result of the monitored uplink power level.

Moreover, those skilled in the art will understand that the various aspects can be practiced with other computer system configurations, including single-processor or multiprocessor computer systems, mini-computing devices, mainframe computers, as well as personal computers, base stations hand-held computing devices or user equipment, such as a tablet, phone, watch, and so forth, processor-based computers/systems, microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 18, a block diagram of a computing system 1800 operable to execute the disclosed systems and methods is illustrated, in accordance with an embodiment. Computer 1802 includes a processing unit 1804, a system memory 1806, and a system bus 1808. System bus 1808 couples system components including, but not limited to, system memory 1806 to processing unit 1804. Processing unit 1804 can be any of various available processors. Dual microprocessors and other multiprocessor architectures also can be employed as processing unit 1804.

System bus 1808 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire and small computer systems interface.

System memory 1806 includes volatile memory 1810 and nonvolatile memory 1812. A basic input/output system, containing routines to transfer information between elements within computer 1802, such as during start-up, can be stored in nonvolatile memory 1812. By way of illustration, and not limitation, nonvolatile memory 1812 can include read only memory, programmable read only memory, electrically programmable read only memory, electrically erasable programmable read only memory, or flash memory. Volatile memory 1810 can include random access memory, which acts as external cache memory. By way of illustration and not limitation, random access memory is available in many forms such as dynamic random access memory, synchronous random access memory, synchronous dynamic random access memory, double data rate synchronous dynamic random access memory, enhanced synchronous dynamic random access memory, Synchlink dynamic random access memory, and direct Rambus random access memory, direct Rambus dynamic random access memory, and Rambus dynamic random access memory.

Computer 1802 also includes removable/non-removable, volatile/non-volatile computer storage media. In an implementation, provided is a non-transitory or tangible computer-readable medium storing executable instructions that, in response to execution, cause a system comprising a processor to perform operations. The operations can include comparing a first network congestion condition and a first network parameter condition received from a first set of network devices of a first network, and a second network congestion condition and a second network parameter condition received from a second set of network devices of a second network to a usage parameter and a movement parameter of a mobile device. The operations can also include determining a radio technology (e.g., radio network device) to which to route network traffic of the mobile device. Determining the routing of the network traffic can include, based on a first outcome of the comparing, determining to route the network traffic to the first set of network devices associated with a first radio technology. In another example, determining the routing of the network traffic can include, based on a second outcome of the comparing, determining to route the network traffic of the mobile device to the second set of network devices associated with a second radio technology. In an implementation, determining the set of network devices can include complying with a network selection policy received from a network device that provides a service to the mobile device. Further, the operations can include facilitating routing of the network traffic of the mobile device to the set of network devices.

In an implementation, the operations can include analyzing relative movement of the mobile device with respect to the first set of network devices 1328 and the second set of network devices 1330. According to another implementation, the operations can include determining speed data representing a substantially current speed of the mobile device and direction data representing a substantially current direction of the mobile device.

FIG. 18 illustrates, for example, disk storage 1814. Disk storage 1814 includes, but is not limited to, devices such as a magnetic disk drive, floppy disk drive, tape drive, external or internal removable storage drives, super disk drive, flash memory card, or memory stick. In addition, disk storage 1814 can include storage media separately or in combination with other storage media including, but not limited to, an optical disk drive such as a compact disk read only memory device, compact disk recordable drive, compact disk rewritable drive or a digital versatile disk read only memory drive. To facilitate connection of the disk storage 1814 to system bus 1808, a removable or non-removable interface is typically used, such as interface component 1816.

It is to be noted that FIG. 18 describes software that acts as an intermediary between users and computer resources described in suitable operating environment. Such software includes an operating system 1818. Operating system 1818, which can be stored on disk storage 1814, acts to control and allocate resources of computer system 1802. System applications 1820 can take advantage of the management of resources by operating system 1818 through program modules 1822 and program data 1824 stored either in system memory 1806 or on disk storage 1814. It is to be understood that the disclosed subject matter can be implemented with various operating systems or combinations of operating systems.

A user can enter commands or information, for example through interface component 1816, into computer system 1802 through input device(s) 1826. Input devices 1826 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1804 through system bus 1808 through interface port(s) 1828. Interface port(s) 1828 include, for example, a serial port, a parallel port, a game port, and a universal serial bus. Output device(s) 1830 use some of the same type of ports as input device(s) 1826.

Thus, for example, a universal serial bus port can be used to provide input to computer 1802 and to output information from computer 1802 to an output device 1830. Output adapter 1832 is provided to illustrate that there are some output devices 1830, such as monitors, speakers, and printers, among other output devices 1830, which use special adapters. Output adapters 1832 include, by way of illustration and not limitation, video and sound cards that provide means of connection between output device 1830 and system bus 1808. It is also noted that other devices and/or systems of devices provide both input and output capabilities such as remote computer(s) 1834.

Computer 1802 can operate in a networked environment using logical connections to one or more remote computers, such as remote computer(s) 1834. Remote computer(s) 1834 can be a personal computer, a server, a router, a network computer, a workstation, a microprocessor based appliance, a peer device, or other common network node and the like, and typically includes many or all of the elements described relative to computer 1802.

For purposes of brevity, only one memory storage device 1836 is illustrated with remote computer(s) 1834. Remote computer(s) 1834 is logically connected to computer 1802 through a network interface 1838 and then physically connected through communication connection 1840. Network interface 1838 encompasses wire and/or wireless communication networks such as local area networks and wide area networks. Local area network technologies include fiber distributed data interface, copper distributed data interface, Ethernet, token ring and the like. Wide area network technologies include, but are not limited to, point-to-point links, circuit switching networks, such as integrated services digital networks and variations thereon, packet switching networks, and digital subscriber lines.

Communication connection(s) 1840 refer(s) to hardware/software employed to connect network interface 1838 to system bus 1808. While communication connection 1840 is shown for illustrative clarity inside computer 1802, it can also be external to computer 1802. The hardware/software for connection to network interface 1838 can include, for example, internal and external technologies such as modems, including regular telephone grade modems, cable modems and DSL modems, ISDN adapters, and Ethernet cards.

It is to be noted that aspects, features, or advantages of the aspects described in the subject specification can be exploited in substantially any communication technology. For example, 4G technologies, Wi-Fi, worldwide interoperability for microwave access, Enhanced gateway general packet radio service, third generation partnership project long term evolution, third generation partnership project 2 ultra-mobile broadband, third generation partnership project universal mobile telecommunication system, high speed packet access, high-speed downlink packet access, high-speed uplink packet access, global system for mobile communication edge radio access network, universal mobile telecommunication system terrestrial radio access network, long term evolution advanced. Additionally, substantially all aspects disclosed herein can be exploited in legacy telecommunication technologies; e.g., global system for mobile communication. In addition, mobile as well non-mobile networks (e.g., Internet, data service network such as Internet protocol television) can exploit aspect or features described herein.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Other combinations of hardware and software or hardware and firmware can enable or implement aspects described herein, including the disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc, digital versatile disc, blu-ray disc . . . ), smart cards, and flash memory devices (e.g., card, stick, key drive . . . ).

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory, read only memory, electrically erasable programmable read only memory, flash memory or other memory technology, compact disk read only memory, digital versatile disk or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output components as well as associated processor, application, or application programming interface components.

The term "set", "subset", or the like as employed herein excludes the empty set (e.g., the set with no elements therein). Thus, a "set", "subset", or the like includes one or more elements or periods, for example. As an illustration, a set of periods includes one or more periods; a set of transmissions includes one or more transmissions; a set of resources includes one or more resources; a set of messages includes one or more messages, and so forth.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A system, comprising:
a memory storing executable components; and
a processor, coupled to the memory, that facilitates execution of the executable components, comprising:
a candidate component configured to determine active device data corresponding to candidate network devices to use for transfer of communications of a mobile device based on a selection of a candidate network device from among the candidate network devices;
an evaluation component configured to generate an evaluation of the candidate network devices of the active device data via a reward function derived from a decision model to select the candidate network device from among the candidate network devices, wherein the decision model accounts for a loading state comprising a set of base station connections for a set of timeslots based on a load capacity of the candidate network devices; and
a network parameter component configured to determine a set of parameters of the reward function that comprise the load capacity of the candidate network devices to be utilized in the evaluation.

2. The system of claim 1, wherein the network parameter component is further configured to determine the set of parameters of the reward function comprising the capacity as a function of a total network bandwidth and respective signal-to-noise ratios for network device-to-mobile device links of the candidate network devices.

3. The system of claim 1, wherein the set of parameters of the reward function further comprises a time cost of respectively routing the communications to the candidate network devices.

4. The system of claim 1, wherein the set of parameters of the reward function further comprises a mobility of the mobile device.

5. The system of claim 1, wherein the set of parameters of the reward function further comprises a time cost of respectively routing the communications to the candidate network devices, and a mobility of the mobile device.

6. The system of claim 1, wherein the set of parameters comprise a signal to noise ratio or a signal strength of the candidate network devices.

7. The system of claim 1, wherein the executable components further comprise:
a transition probability component configured to generate a cell loading state transition probability of the active device data based on a previous network load and a previous network event generated by the candidate network devices.

8. The system of claim 1, wherein the evaluation component is further configured to evaluate the set of parameters using the reward function based on at least one of the capacity, a frequency of connection transfers, or a mobility parameter of the mobile device.

9. The system of claim 1, wherein the evaluation component is further configured to evaluate the set of parameters using the reward function based on a connection transfer time that is a penalty of a transfer of a connection of the mobile device, a total network bandwidth, and respective signal-to-noise ratios for network device-to-mobile device links.

10. The system of claim 1, wherein the evaluation component is further configured to evaluate the set of parameters using the reward function based on a mobility of the mobile device and a time of a transfer of a connection that is determined as a function of a simulated time interval of a continuous movement parameter of the mobile device over a defined change in time into a set of simulated time intervals, a penalty of the transfer of the connection of the mobile device, a total network bandwidth, and respective signal-to-noise ratios for respective network device-to-mobile device links.

11. The system of claim 1, wherein the evaluation component is further configured to evaluate the set of parameters using the reward function based on a non-fixed signal-to-noise ratio for a mobility of the mobile device.

12. The system of claim 11, wherein the non-fixed signal-to-noise ratio is a function of a current reward of a transfer of a connection to the candidate network devices and a predicted reward.

13. The system of claim 12, wherein the current reward is a function of the capacity at a timeslot for the transfer of the connection, and the predicted reward is another function of a path loss at a distance for the transfer of the connection at the timeslot.

14. The system of claim 1, wherein the executable components further comprise:
a partially observable Markov decision component configured to account for a set of defined uncertainties in the capacity of the candidate network devices.

15. The system of claim 14, wherein the partially observable Markov decision component is further configured to generate a profile of the capacity based on a corresponding previous load state and a set of corresponding previous actions that comprise at least one of exceeding a capacity limit or an off-loading event by the candidate network devices to transfer a connection of the mobile device to the selected candidate network device.

16. A method, comprising:
determining, by a device comprising a processing device, an active network device data set comprising candidate network devices from which a candidate network device is selected for routing of communications of a mobile device;
determining a set of parameters of a reward function derived from a decision model, comprising a capacity of the candidate network devices, wherein the decision model that accounts for a profile of a network load level to facilitate network routing decisions;
generating an evaluation of the candidate network devices of the active network device data set via the reward function; and
selecting which of the candidate network devices of the active network device data set to communicate network traffic of the mobile device based on the evaluation.

17. The method of claim 16, further comprising:
determining the set of parameters comprising determining a movement parameter of the mobile device.

18. The method of claim 16, further comprising:
determining the capacity as a function of a total network bandwidth and respective signal-to-noise ratios for respective network device-to-mobile device links.

19. The method of claim 16, further comprising:
generating a profile of the capacity via the reward function based on a previous load state and a set of previous actions corresponding to the candidate network devices, wherein the set of previous actions comprises at least one of an exceeding of a capacity limit or an executing of an off-loading event by the candidate network devices to transfer a connection of at least one mobile device connection to a different network device.

20. The method of claim 16, further comprising generating the reward function based on a loading state transition probability for the candidate network devices that comprises a predicted capacity of the candidate network devices based on a previous load state and a set of previous actions.

21. The method of claim 16, wherein determining the reward function is based on at least one of the capacity, a time amount of a network connection transfer, or a mobility of the mobile device, of the candidate network devices with the set of parameters.

22. The method of claim 16, further comprising:
determining the set of parameters of the reward function comprising the capacity and a time cost of communicating the network traffic of the mobile device from a serving network device to the candidate network device of the candidate network devices.

23. The method of claim 16, further comprising:
determining the set of parameters of the reward function comprising the capacity and a mobility of the mobile device.

24. The method of claim 16, further comprising:
determining the set of parameters of the reward function comprising the capacity, a time cost of communicating the network traffic of the mobile device from a serving network device to the candidate network device of the candidate network devices, and a mobility of the mobile device.

25. A mobile device, comprising:
a memory storing executable instructions; and
a processor, coupled to the memory, that facilitates execution of the executable instructions to at least:
determine active device data that is associated with candidate network devices with which to potentially communicate based on a selection of a candidate network device of the candidate network devices;
generate an evaluation of the candidate network devices of the active device data comprising a network load level and a reward function derived from a decision model for decreasing a number of handovers to a different network of the candidate network devices, wherein the decision model accounts for a profile of a network load level to facilitate network routing decisions; and
determine a network device of the candidate network devices of the active device data with which to communicate based on a reward determined by the reward function.

26. The mobile device of claim 25, wherein the processor further facilitates the execution of the executable instructions to:
route communications to the network device based on a capacity according to a partially observable Markov cell selection.

27. The mobile device of claim 25, wherein the processor further facilitates the execution of the executable instructions to:
route communications to the network device based on a handover time according to a partially observable Markov cell selection.

28. The mobile device of claim 25, wherein the processor further facilitates the execution of the executable instructions to:
route communications to the network device based on a current reward at a time slot determined by the reward function, a predicted reward by the reward function and a movement measure, according to a partially observable Markov cell selection.

29. The mobile device of claim 25, wherein the processor further facilitates the execution of the executable instructions to:
route communications to the network device based on a movement measure and a handover time, according to a partially observable Markov cell selection.

30. The mobile device of claim 25, wherein the network load level comprises an observed number of connections at a time slot respectively for the candidate network devices, and a hidden Markov process selects the network device of the network devices according to the reward by determining a likelihood of the observed number of connections from a historical network load level and a set of corresponding previous actions that comprise at least one of a capacity limit being exceeded or an off-loading event being respectively initiated for the candidate network devices.

* * * * *